US010744398B2

(12) United States Patent
Reeves et al.

(10) Patent No.: US 10,744,398 B2
(45) Date of Patent: \*Aug. 18, 2020

(54) SYSTEMS AND METHODS FOR A TABLE GAME USING A SPECIAL DECK OF CARDS AND A CONVENTIONAL DECK OF CARDS

(71) Applicant: Roxor Gaming Limited, London (GB)

(72) Inventors: Robeson Mandela Reeves, London (GB); Hans Elias, Hertfordshire (GB); Marlon James Dublin, Ilford (GB); Alexander Sanford Todd Young, London (GB)

(73) Assignee: Gamesys, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,621

(22) Filed: May 20, 2019

(65) Prior Publication Data

US 2019/0388774 A1 Dec. 26, 2019

Related U.S. Application Data

(63) Continuation of application No. 16/019,509, filed on Jun. 26, 2018, now Pat. No. 10,322,333.

(51) Int. Cl.
*A63F 1/00* (2006.01)
*A63F 9/24* (2006.01)
(Continued)

(52) U.S. Cl.
CPC .................. *A63F 1/00* (2013.01); *A63F 9/24* (2013.01); *G07F 17/32* (2013.01);
(Continued)

(58) Field of Classification Search
CPC .. A63F 1/00; A63F 3/00157; A63F 2001/003; A63F 2001/008; A63F 13/335; A63F 2250/58; A63F 2003/0164
(Continued)

(56) References Cited

U.S. PATENT DOCUMENTS 6,217,024 B1\* 4/2001 Lofink ...................... A63F 1/00
  273/292
7,942,731 B2\* 5/2011 Walker ...................... A63F 1/00
  273/138.2
(Continued)

OTHER PUBLICATIONS

Office Action for U.S. Appl. No. 16/019,509 dated Oct. 17, 2018; 9 pps.
(Continued)

*Primary Examiner* — Benjamin Layno
(74) *Attorney, Agent, or Firm* — Fincham Downs LLC; Magdalena M. Fincham

(57) ABSTRACT

Embodiments provide for online and/or electronic card games such as blackjack that allow at least one card to be dealt from a special deck (e.g., a restricted deck) into a hand, while the remainder of the cards for that hand (and, in some embodiments, other hands involved in the game event) are dealt from a main/conventional deck. In accordance with some embodiments, the at least one card dealt from the special deck is dealt into a hand of the player while in other embodiments it is dealt into the hand of a dealer and/or an opponent player. A special deck may be a deck that includes cards configured to provide an advantage to the player (e.g., in a blackjack game, restricted deck may only include high value cards if being used for a player hand or only low value cards if being used for a dealer hand).

19 Claims, 16 Drawing Sheets

(51) Int. Cl.
*G07F 17/32* (2006.01)
*A63F 3/00* (2006.01)
*A63F 13/335* (2014.01)

(52) U.S. Cl.
CPC ......... *A63F 3/00157* (2013.01); *A63F 13/335* (2014.09); *A63F 2001/003* (2013.01); *A63F 2001/008* (2013.01); *A63F 2003/00164* (2013.01); *A63F 2250/58* (2013.01)

(58) Field of Classification Search
USPC .......... 273/292, 274, 309, 138.2; 463/12, 13
See application file for complete search history.

(56) References Cited

U.S. PATENT DOCUMENTS

| | | | |
|---|---|---|---|
| 8,764,014 B2* | 7/2014 | Moody | A63F 1/00 273/274 |
| 10,322,333 B1* | 6/2019 | Reeves | A63F 1/00 |

OTHER PUBLICATIONS

Notice of Allowance for U.S. Appl. No. 16/019,509 dated Mar. 20, 2019; 8 pps.

* cited by examiner

SYSTEMS AND METHODS FOR A TABLE GAME USING A SPECIAL DECK OF CARDS AND A CONVENTIONAL DECK OF CARDS

CLAIM OF PRIORITY

The present application is a Continuation Application of U.S. application Ser. No. 16/019,509 filed on Jun. 26, 2018 in the name of Reeves et al. and entitled SYSTEM FOR TABLE GAME USING SPECIAL DECK OF CARDS AND MAIN DECK OF CARDS, now U.S. Pat. No. 10,332,333. The entirety of this application is incorporated by reference herein for all purposes.

BACKGROUND

Card games, using either physical or virtual playing cards, remain a fundamental source of entertainment. Blackjack in particular is a very popular card game. In many variations, however, blackjack and other types of table games do not provide as much volatility or opportunities to affect the game as some players would prefer. Nor do most variations provide opportunities for players to increase their chances of winning the game. Accordingly, there remains a need for an improved system of facilitating table games (e.g., a blackjack game) that increases the volatility and/or number of opportunities for players to affect the game, thereby increasing the enjoyment of the games for many players and attracting additional players to the games.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

Figure 1:
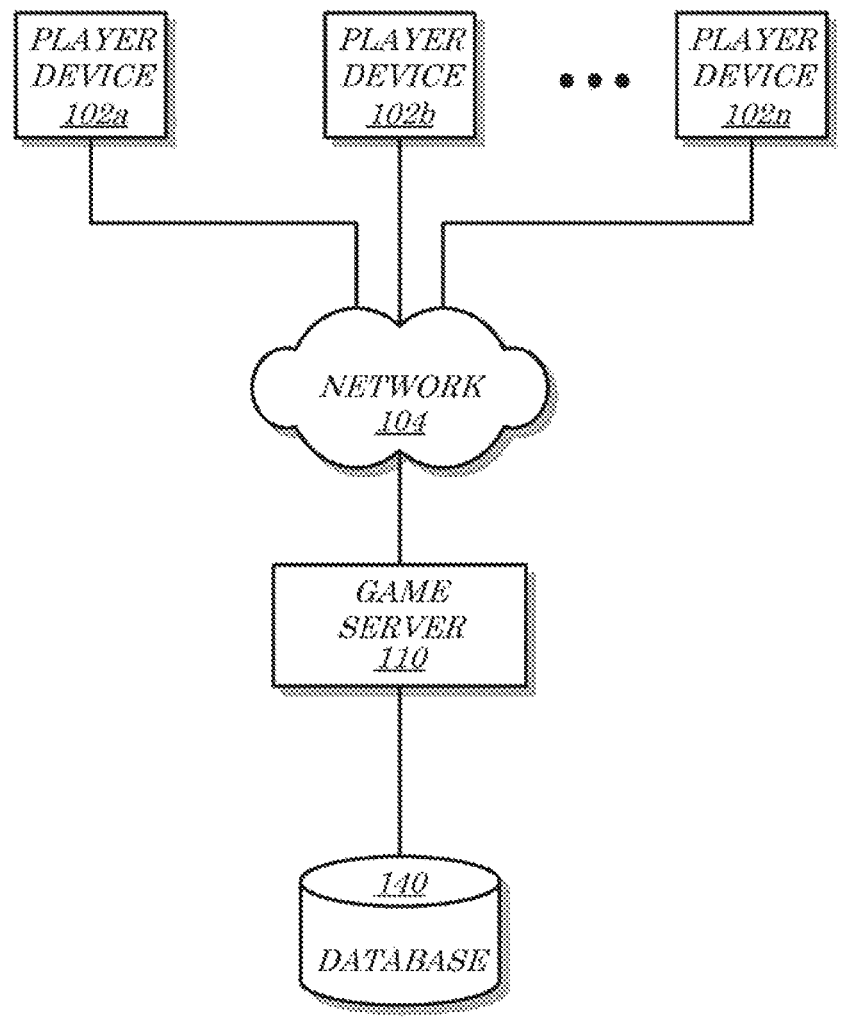
FIG. 1 is a block diagram of a system according to some embodiments.

Embodiments described herein are generally descriptive of systems, graphical user interfaces, methods, apparatus, and articles of manufacture for facilitating an electronic card game (such as blackjack) in which a first player is given the opportunity, for a given hand, a plurality of hands or over a gaming session, to have at least one card for the first player's hand dealt or drawn from a special deck (such as a restricted deck) and/or force the dealer or another player to have at least one card dealt into their hand from a special deck (such as a restricted deck). For example, in one embodiment, a first card for a given hand (whether it be a player's hand or a dealer's hand) may be dealt from a special deck while the remainder of the cards for that hand are dealt from a standard deck of cards. A special deck, as the term is used herein, is a deck that comprises a set of cards other than the traditional fifty-two cards of a conventional deck (e.g., it may not include all of the fifty-two cards, may include extra copies of some of the fifty-two cards and/or may include wild or other special cards that provide benefits to the player). In particular, a special deck (whether it is used to deal cards to the first player's hand, a dealer's hand or a hand of another player that is an opponent of the first player) is a deck of cards that is configured to increase the first player's chances of winning the game event for which it is utilized.

One type of special deck is a restricted deck. A restricted deck, as the term is used herein, refers to a deck that does not include each of the fifty-two cards of a standard deck of cards (although it may include fifty-two, or even more than fifty-two cards, in total). In some embodiments, there may be a restricted deck that is restricted in a first manner (e.g., the restricted deck may include only the 9, 10, J, Q and K cards of one or more suits), the restricted deck being utilized for dealing cards to a player's hand. The first manner may, in accordance with some embodiments, be a manner that improves the player's chance of winning a game event (e.g., winning a black jack hand if the game is a blackjack game). In some embodiments, there may be a restricted deck that is restricted in a second manner (e.g., the restricted deck may include only the 3, 4, 5, 6 and 7 cards of one or more suits), the restricted deck being utilized for dealing cards to a dealer's hand. The second manner may, in accordance with some embodiments, also be a manner that improves the player's chance of winning a game event (even though it is utilized to deal cards to a dealer's hand) or decreases the dealer's chance of winning the game. In some embodiments, both the restricted deck that is restricted in the first manner (a "player hand restricted deck") and the restricted deck that is restricted in the second manner (a "dealer hand restricted deck") may be utilized for a given hand or round of a card game or game event. Similarly, any type of special deck may be made special in a first manner if it is used for dealing cards to the player's hand, made special in a second manner if it is being utilized for dealing cards to the dealer's hand or made special in even a third manner if it is being utilized to deal cards to an opponent player (in games in which players play against one another, such as in some poker games).

Another type of special deck is an enhanced deck. An enhanced deck, as the term is used herein, comprises a deck of cards that includes cards additional to the traditional fifty-two (52) card deck). For example, an enhanced deck may include each of the fifty-two cards but also two of each of the Aces, or double the number of face cards, etc. In another example, an enhanced deck may include one or more cards which have special attributes (e.g., a wild card, a win multiplier cards, etc.).

In some embodiments, the player may be charged a fee or commission in exchange for utilizing at least one of the player hand restricted deck and the dealer hand restricted deck (or any type of special deck). In some embodiments, the player may be provided with a choice (e.g., at the beginning of a hand or gaming session) as to whether at least one restricted deck (or other type of special deck) is to be utilized for game play in a given game event or game session. In some embodiments, the player may win or be awarded an opportunity to utilize at least one of the player hand restricted deck and the dealer hand restricted deck (or some other type of special deck) as a prize. For example, the player may be awarded access to a special deck as a bonus or other reward provided to the player as a result of a first game event, and available for use in a second game event. In other embodiments, a restricted deck (or other type of special deck) may be utilized in all hands of the game (e.g., for dealing a subset of the cards into a given hand, while the remainder of the cards for that hand are dealt from a standard deck of cards) and the player may not be provided with an option of whether to utilize a restricted deck (or other type of special deck) in accordance with the rules of the game.

It should be noted that although reference is made herein to what may be done with respect to a "restricted deck", all or many of such embodiments and description may be applied equally to other types of special decks and the term restricted deck is utilized for illustrative, and non-limiting, purposes only. In some passages it is explicitly made clear that an embodiment may be applicable to the genus of a special deck and the species of a restricted deck. However, even if this is not made explicitly clear, it should be understood that all of the embodiments described herein (if at all practicable) may be applied to special decks in general and to the type of special deck referred to herein as a restricted deck.

It should be noted that although some of the embodiments described herein (and illustrated herein with respect to FIGS. 6, 7A-7C, 8, 9A-9C) refer to a blackjack game as the type of game being played, the embodiments described with respect to these figures and throughout the present description are not limited to application within a blackjack game and may be included in any game in which a restricted deck may reasonably be provided. Similarly, the embodiments described herein are not limited to games in which a dealer is dealt cards in addition to a player being dealt cards (e.g., the embodiments may be applied in a video poker game in which cards are dealt to the player but not to a dealer). Thus, the use of blackjack as the type of game in which the embodiments may be applied is for illustrative purposes only.

In traditional blackjack (blackjack being one type of card game to which at least some of the embodiments described herein may be applied), a player determines a wager for a hand and places the wager. The player is initially dealt two cards (the "initial hand" or "initial cards") from a deck (sometimes more than one deck is utilized and combined in a virtual or physical card shoe and the cards are dealt from this set of combined decks). The player must then make a decision regarding these initial cards (a game play decision, which may include options such as whether to ask for an additional card ("hit"), stay with just the two initial cards ("stand"), split the two cards into two separate hands ("split"), or double an initial wager ("double down")). A final hand is then determined (which may comprise only the two initial cards dealt if the player elected to "stand" or may include at least one additional card dealt to the player if the player's game play decision was to request additional card(s) be dealt). At the same time, a two or more cards are dealt from the deck or set of combined decks to the dealer's initial hand and final hand (based on game play decisions of the dealer or automated game play decisions made by a processor on behalf of the dealer). The game event is then resolved by comparing the final hand of the player to the final hand of the dealer (unless the player "busts" by obtaining a final hand whose value is over twenty-one (21), in which case no comparison to the dealer's hand may be necessary). The winning hand is the one that is closest to the value of twenty-one (21) without going over twenty-one (21). If the player's final hand is determined to be the winning hand over the dealer's final hand, an appropriate amount of winnings is provided to the player (e.g., an appropriate amount of credits is added to a credit balance of the player). In most blackjack games, face cards are worth ten (10) points, Aces are worth either one (1) or eleven (11) points. A player's chances of winning a hand are typically improved if at least one of the first two cards dealt to the player's hand is a face card, a nine, ten or an Ace. Similarly, a player's chances of winning a hand are typically improved if at least one of the first two cards dealt to a dealer's hand is a relatively low value card (e.g., a card having a value of less than nine (9)).

In other types of card games (e.g., poker, baccarat), a player may similarly benefit or increase his chances of winning the game if he is allowed to draw at least one card (or force another player or a dealer to draw at least one card) from a deck that is special in some manner (e.g., restricted in some manner) so as to increase the player's chances of winning the hand into which the cards from the special deck are being dealt. For example, in a poker game, a player may be allowed to have one card dealt into his hand from a special deck that includes at least one wild card (or an extra wild card) or a restricted deck that includes only cards that are more favorable to the player.

In accordance with some embodiments, the systems, methods and articles of manufacture described herein provide for a mechanism via which a player may elect to have at least one card for a game event (e.g., for a hand of blackjack) dealt from a special deck (e.g., a restricted deck) while the remainder of the cards for the game event are dealt from a conventional or main deck. In accordance with some embodiments, a restricted is one which does not include each of the fifty-two cards (52) that are included in a full deck while a full deck (also referred to herein as a conventional deck or a main deck) is one that includes one of each of the fifty-two (52) cards typically included in a conventional deck (2-10, J, Q, K and A; one of the foregoing in each of the four suits). In accordance with some embodiments, a restricted deck may be utilized to deal cards to the player's hand while in other embodiments a restricted deck may be utilized to deal cards to the dealer's hand. In some embodiments, a restricted deck may not only not include some cards but may include more than one of certain cards. For example, a restricted deck for a player's hand may not only be limited to include relatively high value cards (e.g., 9s, 10s and face value cards) but may further include more than one of at least one specific card (e.g., it may have two of at least one of the Aces), to further enhance the player's chances of winning.

A deck may be restricted in different ways. For example, in some embodiments a deck may be restricted such that it only includes relatively high value cards of each suit. Such a restricted deck is referred to as a high value restricted deck and may, in some embodiments, be utilized to deal the first card into a player's hand. For example, a high value restricted deck may only include cards of having values of A, K, Q, J, 10 and 9. In other embodiments a deck may be restricted such that it only includes relatively low value cards of each suit. Such a restricted deck is referred to as a low value restricted deck and may, in some embodiments, be utilized to deal the first card into a dealer's hand. In one example, a restricted deck may only include cards of value, 2, 3, 4, 5 and 6 (e.g., cards that the dealer is most likely to bust on, in embodiments in which the low value restricted deck is utilized to deal the first card into the dealer hand). In another example a restricted deck may only include cards of value 3, 4, 5, 6 and 7 (e.g., cards to be used to deal the first card into a dealer's first hand and that give the player a significant edge in a six (6) deck game).

In accordance with some embodiments, a restricted deck may comprise a plurality of restricted decks that are each restricted in the same manner. For example, a high value restricted deck may comprise cards from six (6) decks of cards, but may only include the relatively high value cards from each deck (e.g., only the As, Ks, Qs, Js, 10s and 9s from each deck).

In accordance with some embodiments, a player may be provided with an option to choose whether one card for a game event (e.g., the first card deal to the player's hand or the first card dealt to the dealer's hand) is to be dealt from a special deck while the remaining cards for the game event are dealt from a main (or traditional) deck.

As one illustrative example embodiment, in a blackjack game a game event may comprise, for example, a dealing of up to the maximum allowed number of cards for both the dealer's hand and the player's hand such that a resolution of a wager is possible. In accordance with some embodiments, the player may have a further option of selecting whether the restricted deck is to be utilized to deal the first card to the dealer's hand (in which case a low value restricted deck may be utilized) or whether a restricted deck is to be utilized to deal the first card to the player's hand (in which care a high value restricted deck may be utilized). Thus, in some embodiments, a game may have available for use both a high value restricted deck (e.g., for use in dealing a first card to a players hand) and a low value restricted deck (e.g., for use in dealing a first card to a dealer's deck). In other embodiments a restricted deck (or other type of special deck) may only be available for one of a dealer's hand (in which case the restricted deck may comprise a low value restricted deck) or a player's hand (in which case the restricted deck may be a high value restricted deck) and thus the game design may only include the one type of restricted deck. In game in which only a first player is dealt cards (i.e., no dealer is involved and no opponent players are involved, such as in video poker), there may only be a need for one type of restricted deck (or other type of special deck). In other embodiments, the player may not have an option as to whether to have a card dealt (whether into a dealer's hand, the player's own hand or an opponent player's hand) from a restricted deck (or another type of special deck) and the game may be designed such that one of the cards for at least one of the hands is always dealt from the restricted deck (or another type of special deck). For example, one game version may be designed such that the first card for the dealer's hand is always dealt from a low value restricted deck while another game version may be designed such that the first card for the player's hand is always dealt from a high value restricted hand.

In accordance with some embodiments, a player may be required to pay a fee or place a wager of at least a minimum magnitude in order to qualify for having a card be dealt from a special deck such as a restricted deck (whether it be a high value restricted deck for dealing cards to the player's hand or a low value restricted deck for dealing cards to the dealer's hand). In some embodiments, a player may otherwise have to qualify for the special deck feature (e.g., by playing at a certain pace, by playing a minimum number of hands or for a minimum duration of time, by winning a certain bonus feature, by obtaining a certain symbol, card or other game element while playing the game, etc.).

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

A "game", as the term is utilized herein (unless otherwise specified), may generally comprise any game (e.g., wagering or non-wagering, skill-based, chance-based, playable by hand (e.g., utilizing non-electric physical components, boards, and/or pieces), and/or electronically playable over a network) playable by one or more players in accordance with specified rules. An electronic game may be playable on a Personal Computer (PC), online in web browsers, on a game console, and/or on a mobile device such as a smartphone or tablet computer. "Gaming" thus generally refers to play of a game (e.g., by one or more players).

A "casual game", as the term is utilized herein (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as utilized herein (unless otherwise specified), generally refers to a type of online game that is played through a social network, and in some embodiments may feature multiplayer and/or asynchronous game play mechanics. A "social network" may refer to an online service, online community, platform, and/or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a web browser and/or web-client game, a Flash®, or Java®-scripted game, and/or may be implemented on one or more mobile platforms such as on portable electronic devices.

A "wagering game", as the term is utilized herein (unless otherwise specified), may generally comprise a game in which a player can risk a wager or other consideration, such as, but not limited to: slot-style games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as utilized herein (unless otherwise specified), generally refers to an entity or system of components which provides games for play and facilitates play of such game by use of a network such as the Internet or a proprietary or closed network (e.g., an intranet or local or wide area network). For example, a game provider may operate a website which provides games in a digital format over the Internet. In some embodiments in which a game comprising a wagering game is provided, a game provider may operate a gambling website over which wagers are accepted and results (e.g., winnings) of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As utilized herein, a "player device" is a subset of a "network device". The "network device", for example, may generally refer to any device that can communicate via a network, while the "player device" may comprise a network device that is owned and/or operated by or otherwise associated with a player (e.g., a network device specifically configured to permit use thereof by the player, such as by receiving login credentials from the player). Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components. In some embodiments, a player device may comprise an electronic device configured to initiate, conduct, facilitate, and/or otherwise permit player participation in an electronic game.

As utilized herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As utilized herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As utilized herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as utilized herein (unless otherwise specified), may generally refer to any indicia and/or other information indicative of or associated with a subject, item, entity, and/or other object and/or idea. As utilized herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is utilized herein (unless otherwise specified), may generally comprise a period of time spanning a plurality of event instances (e.g., with respect to a communication and/or game session) or turns of a game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., an RNG is contacted or communicated with to identify, generate or determine a random number to be used to determine an outcome for the event instance).

As utilized herein, the terms "outcome" and "result" should be differentiated in the present description in that an "outcome" is generally a representation of a "result", typically comprising one or more game elements or game symbols. For example, in a "fruit themed" slot-style game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As utilized herein, the term "virtual currency" may generally refer to an in-game currency that may be utilized as part of a game or one or more games provided by a game provider as (i) currency for making wagers, and/or (ii) to purchase or access various in-game items, features or powers (e.g., "freemium" upgrades and/or options).

A "credit balance", as the term is utilized herein (unless otherwise specified), may generally refer to (i) a balance of currency, whether virtual currency and/or real currency, usable for making wagers and/or purchases in a game and/or (ii) another tracking mechanism for tracking a player's success or advancement in a game by deducting there from points or value for unsuccessful attempts at advancement and adding thereto points or value for successful attempts at advancement.

Referring now to FIG. 1, a block diagram of an example system 100 according to some embodiments is shown. The system 100 may comprise, for example, a plurality of player devices 102a-n in communication, e.g., via a network 104, with a game server 110. For simplicity of description only, any or all of the player devices 102a-n are referred to herein as a player device 102, even though the plurality of player devices 102a-n may include different quantities and/or types of player devices (as described below). The game server 110 may be operable to communicate with and/or access a database 140 (which may comprise one or more databases and/or tables and which may comprise a storage device distinct from (or be a component of) the game server 110). Database 140 may, for example, store rules enabling play of a blackjack game utilizing one or more restricted decks as described herein (and, in some embodiments, the particular cards that are included in each such restricted deck). In some embodiments, database 140 may be stored on or by the game server 110 while in other embodiments database 140 may be stored on or by another computing device with which the game server 110 is operable to communicate in order to at least access the data in database 140 (e.g., another server device remote from game server 140, operable to determine outcomes for an event instance of a game; not shown). In some embodiments a processor (e.g., one or more microprocessors, one or more microcontrollers, one or more digital signal processors; not separately shown) of a player device 102 and/or game server 110 may receive instructions (e.g., from a memory or like device; e.g., the database 140), and execute those instructions, thereby performing one or more processes defined by those instructions. Instructions may be embodied in, e.g., one or more computer programs and/or one or more scripts or codes.

In some embodiments the game server 110 and/or one or more of the player devices 102a-n stores and/or has access to data useful for facilitating play of a game. In one or more embodiments, stored data and instructions may enable and/or cause play with one or more restricted decks. For example, game server 110 and/or a player device 102 may store (i) one or more probability databases for determining one or more potential outcome(s) for a given event instance (e.g., blackjack hand outcomes), or a specific hand during game play (e.g., in one embodiment different probability tables are accessed depending on whether a card is being dealt from a main deck, a low value restricted deck or a high value restricted deck); (ii) a current state or status of a game or game session (e.g., which cards or how many cards have been dealt so far and from which deck); (iii) one or more user interfaces for use in a game; (iv) one or more game themes for a game; and/or (v) profiles or other personal information associated with players of a game. It should be noted that in some embodiments such data may be stored on the game server 110 and information based on such data may be output to a player device 102 during play of a game while in other embodiments a game program may be downloaded to a local memory of a player device 102 and thus such data may be stored on a player device 102 (e.g., in encrypted or other secure or tamper-resistant form).

According to some embodiments, the game server 110 may comprise a computing device for facilitating play of a game (e.g., by receiving an input from a player, determining at least one card dealt for a hand, causing an outcome and/or result of a game to be displayed on a player device, determining a win result for a wager, facilitating a wager and/or a provision of a payout for a game). For example, the game server 110 may comprise a server computer operated by a game provider or another entity (e.g., a social network website not primarily directed at providing games). In some embodiments, the game server may enable play of a card game that utilizes one or more restricted decks or one or more special decks herein (also referred to as "restricted deck card game" and "special deck card game" herein) that may determine which of a plurality of available decks a given card is to be dealt from (e.g., whether from a main deck, a low value restricted deck or a high value restricted deck or another type of special deck), and receive an indication of such a card from another remote server (not shown) operable to provide card information. In some embodiments, the game server 110 may further be operable to facilitate or implement a restricted deck card game program. In accordance with some embodiments, in addition to administering or facilitating play of a game, the game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, the game server 110 may comprise two or more server computers operated by the same entity (e.g., one server being primarily for storing states of games in progress and another server being primarily for storing mechanisms for determining outcomes of games, such as a random number generator).

In accordance with some embodiments, the player device 102 may comprise a computing device that is operable to execute or facilitate the execution of a game program and used or useful by online players for accessing an online casino or other electronic (e.g., online) game provider or server. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™, and/or Nintendo™ Wii™), and/or handheld or portable video game devices (e.g., Nintendo™ Game Boy™ or Nintendo™ DS™) A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). In some embodiments, the game server 110 may be in communication with a variety of different types of player devices 102a-n.

According to some embodiments, a player device 102 may be used to play a wagering or non-wagering game (e.g., a social or casual game) over a network and output information relating to the game to players participating in the game (e.g., outcomes for an event instance of the game, qualifying for a bonus round of the game, outcomes determined for a bet, a win result of a bet, credit balance of credits available for play of the game, etc.). Any and all information relevant to any of the aforementioned functions may be stored locally on one or more of the player devices 102 and/or may be accessed using one or more of the player devices 102 (in some embodiments such information being stored on, or provided via, the game server 110). In some embodiments, a player device 102 may store some or all of the program instructions for determining, for example, (i) that an event instance or game instance (e.g., a specific blackjack hand) has been triggered or initiated (and, in some embodiments, communicating such a trigger or initiation to game server 110), (ii) a win result for a bet (e.g., which may be dependent on a plurality of outcomes), and/or (iv) modifying a game interface to reflect events within the game. In some embodiments, the game server 110 may be operable to authorize the one or more player devices 102a-n to access such information and/or program instructions remotely via the network 104 and/or download from the game server 110 (e.g., directly or via an intermediary server such as a web server) some or all of the program code for executing one or more of the various functions described herein. In some embodiments, outcome and/or result determinations may be carried out by the game server 110 (or another server with which the game server 110 communicates) and the player devices 102 may be terminals for displaying to an associated player such outcomes and results and other graphics and data related to a game.

In some embodiments, the one or more player devices 102a-n may each be located at the same location as at least one other player device 102 (e.g., such as in a casino or internet café) or remote from all other player devices 102. Similarly, any given player device may be located at the same location as the game server 110 or may be remote from the game server 110. In some embodiments, while the game server 110 may be useful or used by any of the player devices 102 to perform certain functions described herein, the game server 110 need not control any of the player devices 102. For example, in some embodiments the game server 110 may comprise a server hosting a website of an online casino accessed by one or more of the player devices 102.

In some embodiments, a game server 110 may not be necessary or desirable. For example, some embodiments described herein may be practiced on one or more player devices 102a-n without a central authority. In such embodiments, any functions described herein as performed by the game server 110 and/or data described as stored on the game server 110 may instead be performed by or stored on one or more player devices 102a-n. Additional manners of distributing information and program instructions among one or more player devices 102a-n, the game server 110 and/or other network devices may be utilized in some embodiments.

Figure 2:
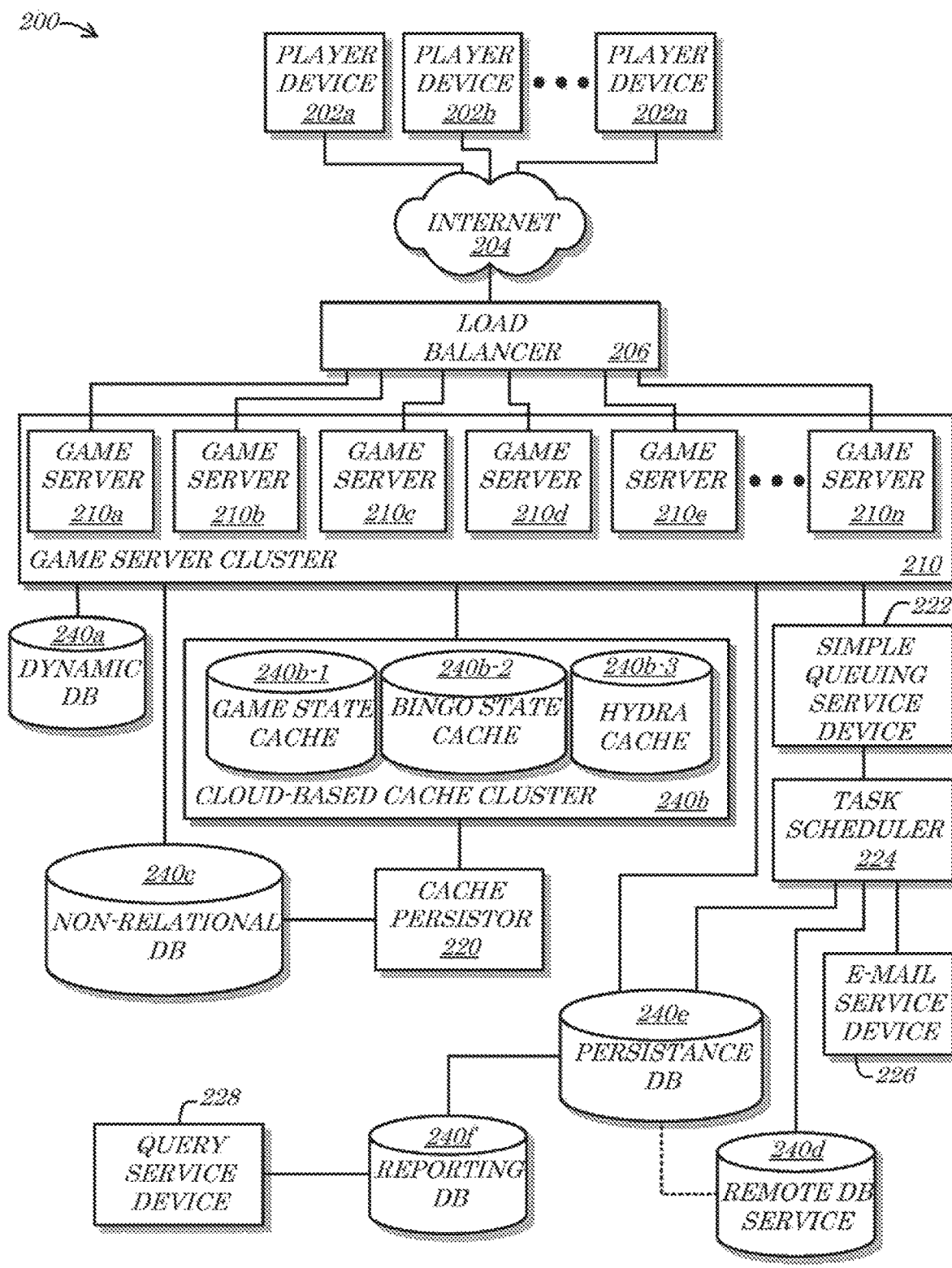
FIG. 2 is a block diagram of a system according to some embodiments.

Turning to FIG. 2, a block diagram of a system 200 according to some embodiments is shown. In accordance with some embodiments, the system 200 may comprise a plurality of player devices 202a-n, the Internet 204, a load balancer 206, and/or a game server cluster 210. The game server cluster 210 may, in some embodiments, comprise a plurality of game servers 210a-n. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202a-n, 204, 206, 210a-n, 220, 222, 224, 226, 228 may be in communication with and/or coupled to one or more databases 240a-f. The system 200 may comprise, for example, a dynamic DataBase (DB) 240a, a cloud-based cache cluster 240b (e.g., comprising a game state cache 240b-1, a slot state cache 240b-2, and/or a "hydra" cache 240b-3), a non-relational DB 240c, a remote DB service 240d, a persistence DB 240e, and/or a reporting DB 240f.

According to some embodiments, any or all of the components 202a-n, 204, 206, 210a-n, 220, 222, 224, 226, 228, 240a-f of the system 200 may be similar in configuration and/or functionality to any similarly named and/or numbered components described herein. Fewer or more components 202a-n, 204, 206, 210a-n, 220, 222, 224, 226, 228, 240a-f (and/or portions thereof) and/or various configurations of the components 202a-n, 204, 206, 210a-n, 220, 222, 224, 226, 228, 240a-f may be included in the system 200 without deviating from the scope of embodiments described herein. While multiple instances of some components 202a-n, 210a-n, 240a-f are depicted and while single instances of other components 204, 206, 220, 222, 224, 226, 228 are depicted, for example, any component 202a-n, 204, 206, 210a-n, 220, 222, 224, 226, 228, 240a-f depicted in the system 200 may comprise a single device, a combination of devices and/or components 202a-n, 204, 206, 210a-n, 220, 222, 224, 226, 228, 240a-f, and/or a plurality of devices, as is or becomes desirable and/or practicable. Similarly, in some embodiments, one or more of the various components 202a-n, 204, 206, 210a-n, 220, 222, 224, 226, 228, 240a-f may not be needed and/or desired in the system 200.

According to some embodiments, the player devices 202a-n may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online blackjack (e.g., restricted deck blackjack game as described herein), bingo, slots, poker, and/or other games of chance, skill, and/or combinations thereof. In some embodiments, the various game servers 210a-n (virtual and/or physical) of the game server cluster 210 may be configured to provide, manage, host, and/or conduct individual instances of available game types. A first game server 210a, for example, may host a first particular instance of an online restricted deck blackjack game (or tournament), a second game server 210c may host a second particular instance of an online roulette game (or tournament), a third game server 210c may facilitate an online poker tournament, and/or a fourth game server 210d may provide an online slots game.

In some embodiments, the player devices 202a-n may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for some game types the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)). Such a broadcaster device may, for example, broadcast and/or output (or cause the output of; e.g., by transmitting command signals to a display device) any or all of wager options, wager time window data (e.g., opening and/or closing timing information for placing a wager in an restricted deck blackjack game), card(s) dealt from a given deck, initial hand outcomes for a blackjack game, player game play decisions, moves, and/or choices, final hand outcomes, and/or game results.

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., blackjack) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, blackjack state (e.g., restricted deck blackjack game-specific state) data may be stored in the blackjack state cache 240*b*-2, and/or other game and/or player information (e.g., restricted deck blackjack game logic, progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game, secondary or bonus game, and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve information concerning a specific blackjack hand, and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
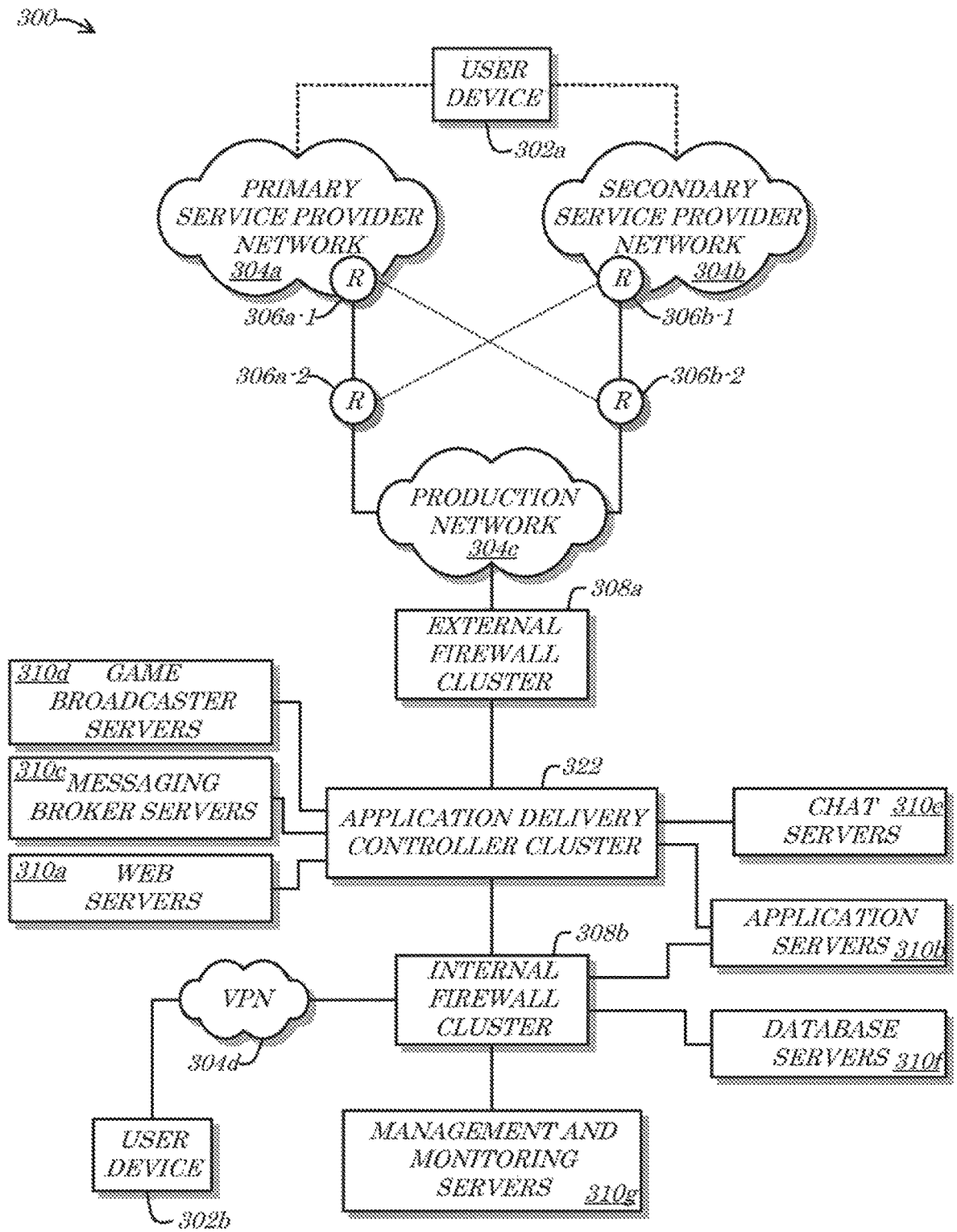
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more restricted deck blackjack or other carg games as described herein). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be or comprise a smart phone, smart watch, tablet or personal computer capable of accessing a network. The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and//or commands from the first user device 302*a*. The first user device 302*a* may, for example, submit a call for an online gaming interface (e.g., the interface 720 of FIG. 7A, FIG. 7B, and/or FIG. 7C herein) to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a-g*. In the case that the first user device 302*a* is utilized to access an online gaming interface (not explicitly shown; e.g., the interface 720 of FIG. 7A, FIG. 7B, and/or FIG. 7C herein) for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines and/or automatic game play engines or logic modules) may be called and/or managed by the application delivery controller cluster 322.

In some embodiments, the messaging broker servers 310*c* may receive and/or retrieve messages from the first user device 302*a* (and/or from one or more of the other servers 310*a-b*, 310*d-g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results, and/or automated game play decision information, that may be accessed by (and/or transmitted to) the first user device 302a (e.g., in connection with the play of an online restricted deck blackjack and/or other game for which broadcast information may be utilized). In some embodiments, the chat servers 310e may provide, manage, and/or facilitate communications between the first user device 302a (and/or first user thereof) and one or more other player/user devices (such as a second user device 302b and/or other player/user devices not shown in FIG. 3).

According to some embodiments, the second user device 302b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online game provider may, for example, utilize the second user device 302b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 302b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 302b. The second user device 302b may, for example, access the management and monitoring servers 310g and/or the database servers 310f to run reports descriptive of online gaming operations, game play, and/or game referral setup, management, and/or analysis. According to some embodiments, either or both of the user devices 302a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the methods 600, 800 of FIG. 6 and/or FIG. 8 herein, and/or one or more portions and/or combinations thereof) as described herein. In some embodiments, the user devices 302a-b in conjunction with one or more of the servers 310a-g and/or the application delivery controller cluster 322 may facilitate the execution of procedures, applications and processes that differ between the first user device 302a and the second user device 302b creating different gaming experiences for the two users of these respective devices, even if playing the same game, in the same game session, etc.

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the severs 310a-g are depicted in FIG. 3, any or all of the servers 310a-g may be implemented in, on, and/or by one or multiple computer server and/or other electronic devices.

Figure 4:
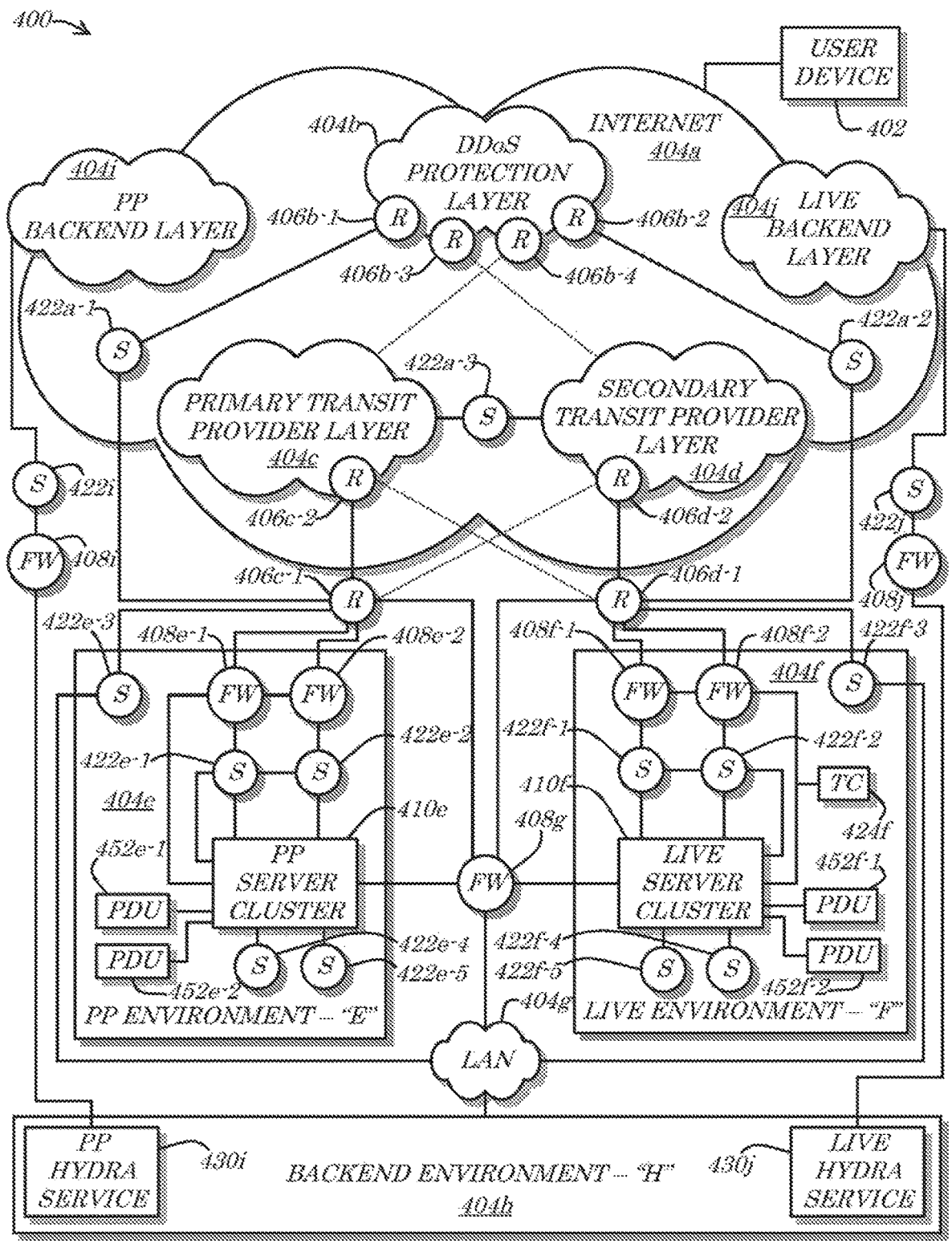
FIG. 4 is a block diagram of a system according to some embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more restricted deck card games, such as blackjack games as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404a-j (e.g., the Internet 404a, a Distributed Denial-of-Service (DDoS) protection layer 404b, a primary transit provider layer 404c, a secondary transit provider layer 404d, a Pre-Production (PP) environment 404e, a live environment 404f, a LAN 404g, a backend environment 404h, a PP backend layer 404i, and/or a live backend layer 404j), a plurality of routers 406b-d, a plurality of firewall devices 408e-g, 408i-j, a plurality of servers 410e-f (e.g., a PP server cluster 410e and/or a live server cluster 410f), a plurality of switching devices 422a, 422e-f, 422i-j, a Terminal Concentrator (TC) 424f, a plurality of "hydra" services 430i-j (e.g., a PP hydra service 430i and/or live hydra service 430j), and/or a plurality of Power Distribution Unit (PDU) devices 452e-f.

According to some embodiments, any or all of the components 402, 404a-j, 406b-d, 408e-g, 408i-j, 410e-f, 422a, 422e-f, 422i-j, 424f, 430i-j, 452e-f of the system 400 may be similar in configuration and/or functionality to any similarly named and/or numbered components described herein. Fewer or more components 402, 404a-j, 406b-d, 408e-g, 408i-j, 410e-f, 422a, 422e-f, 422i-j, 424f, 430i-j, 452e-f (and/or portions thereof) and/or various configurations of the components 402, 404a-j, 406b-d, 408e-g, 408i-j, 410e-f, 422a, 422e-f, 422i-j, 424f, 430i-j, 452e-f may be included in the system 400 without deviating from the scope of embodiments described herein. While multiple instances of some components 404a-j, 406b-d, 408e-g, 408i-j, 410e-f, 422a, 422e-f, 422i-j, 430i-j, 452e-f are depicted and while single instances of other components 402, 424f are depicted, for example, any component 402, 404a-j, 406b-d, 408e-g, 408i-j, 410e-f, 422a, 422e-f, 422i-j, 424f, 430i-j, 452e-f depicted in the system 400 may comprise a single device, a combination of devices and/or components 402, 404a-j, 406b-d, 408e-g, 408i-j, 410e-f, 422a, 422e-f, 422i-j, 424f, 430i-j, 452e-f, and/or a plurality of devices, as is or becomes desirable and/or practicable. Similarly, in some embodiments, one or more of the various components 402, 404a-j, 406b-d, 408e-g, 408i-j, 410e-f, 422a, 422e-f, 422i-j, 424f, 430i-j, 452e-f may not be needed and/or desired in the system 400.

In some embodiments, the user device 402 may be utilized to access one or more of the PP environment 404e, the live environment 404f, and/or the backend environment 404h via the Internet 404a. In some embodiments, the user device 402 may be utilized to access the backend environment 404h and/or the PP hydra service 430i via the PP backend layer 404i. A PP backend switch device 422i and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410f (e.g., via the Internet 404a) may conduct (in whole or in part), facilitate, and/or otherwise be associated with execution of one or more stored procedures, applications, processes, and/or methods (e.g., the methods 600, 800 of FIG. 6 and/or FIG. 8 herein, and/or one or more portions thereof) as described herein. In some embodiments, the user device 402 in conjunction with the live server cluster 410f may conduct, or facilitate the execution of procedures, applications and processes that differ between different user devices 402 (not shown explicitly/separately in FIG. 4), creating different gaming experiences for the two users of these devices, even if playing the same game, in the same game session, etc.

Figure 5:
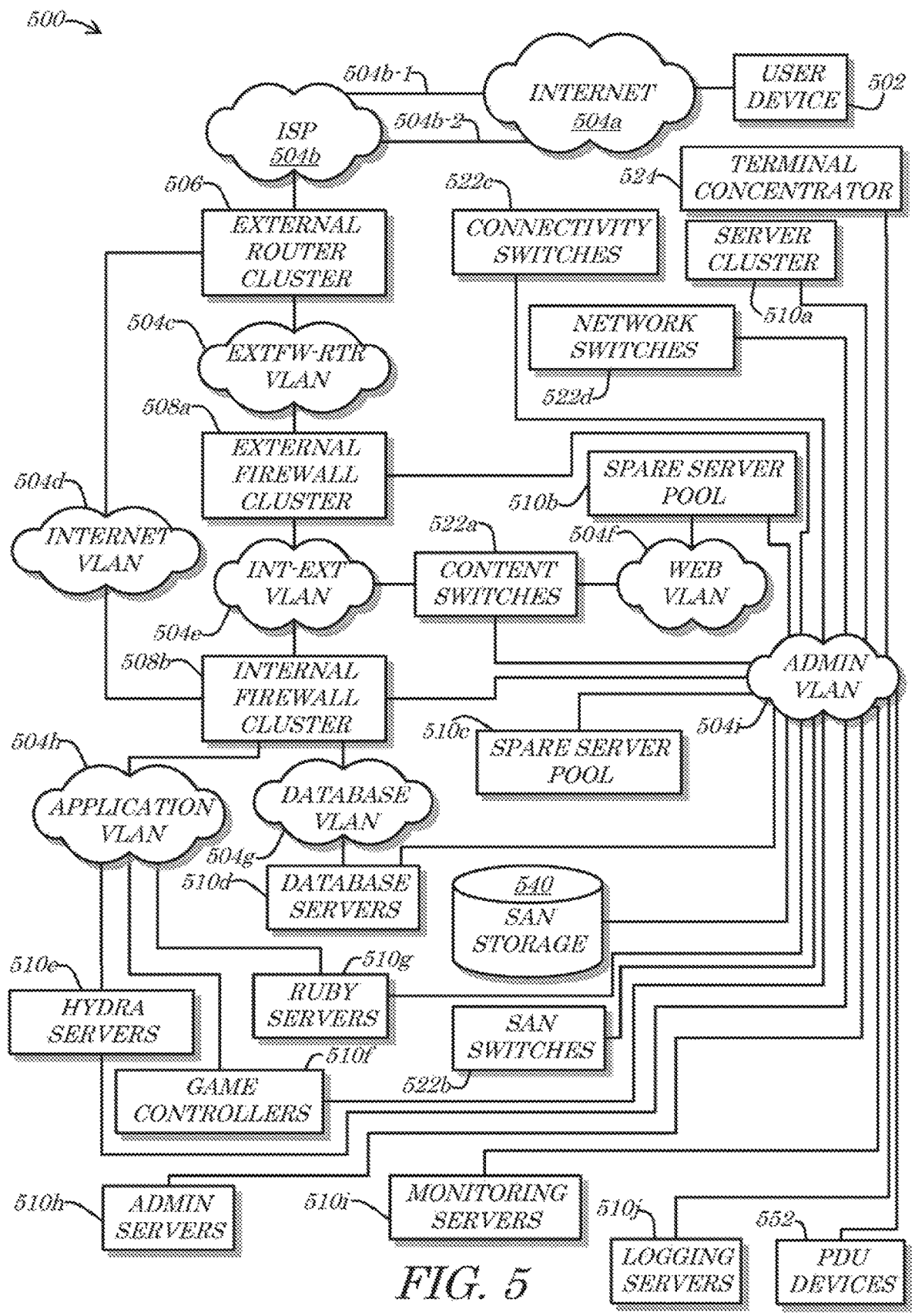
FIG. 5 is a block diagram of a system according to some embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played (e.g., one or more restricted deck blackjack games as described herein). The system 500 may be utilized in conjunction with the systems 300, 400 if FIG. 3 and/or FIG. 4 herein, for example, and/or may be similar in configuration and/or functionality to the backend environment 404h of the system 400 of FIG. 4. In some embodiments, the system 500 may comprise a user device 502, a plurality of networks (and/or environments and/or layers) 504a-i (e.g., the Internet 504a, an ISP 504b, an External Firewall-Router (EXTFW-RTR) Virtual LAN (VLAN) 504c, an Internet VLAN 504d, an Internal-External (INT-EXT) VLAN 504e, a web VLAN 504f, a database VLAN 504g, an application VLAN 504h, and/or an administrator VLAN 504i), an external router cluster 506, a plurality of firewall clusters 508a-b (e.g., an external firewall cluster 508a and/or an internal firewall cluster 508b), a plurality of servers 510a-j (e.g., a server cluster 510a, a first spare server pool 510b, a second spare server pool 510c, database servers 510d, "hydra" servers 510e, game controllers 510f, ruby servers 510g, admin servers 510h, monitoring servers 510i, and/or logging servers 510j), a plurality of switches 522a-d (e.g., content switches 522a, Storage Area Network (SAN) switches 522b connectivity switches 522c, and/or network switches 522d), a TC device 524, a SAN storage device 540, and/or one or more PDU devices 552.

According to some embodiments, any or all of the components 502, 504a-I, 506, 508a-b, 510a-j, 522a-d, 524, 540, 552 of the system 500 may be similar in configuration and/or functionality to any similarly named and/or numbered components described herein. Fewer or more components 502, 504a-I, 506, 508a-b, 510a-j, 522a-d, 524, 540, 552 (and/or portions thereof) and/or various configurations of the components 502, 504a-I, 506, 508a-b, 510a-j, 522a-d, 524, 540, 552 may be included in the system 500 without deviating from the scope of embodiments described herein. While multiple instances of some components 504a-I, 508a-b, 510a-j, 522a-d are depicted and while single instances of other components 502, 506, 524, 540, 552 are depicted, for example, any component 502, 504a-I, 506, 508a-b, 510a-j, 522a-d, 524, 540, 552 depicted in the system 500 may comprise a single device, a combination of devices and/or components 502, 504a-I, 506, 508a-b, 510a-j, 522a-d, 524, 540, 552, and/or a plurality of devices, as is or becomes desirable and/or practicable. Similarly, in some embodiments, one or more of the various components 502, 504a-I, 506, 508a-b, 510a-j, 522a-d, 524, 540, 552 may not be needed and/or desired in the system 500.

In some embodiments, the user device 502 may be utilized to access and/or interface with one or more of the servers 510a-j via the Internet 504a. In some embodiments, the Internet 502a may be linked to the ISP 504b via multiple (e.g., redundant) connectivity paths 504b-1, 504b-2 (e.g., for load balancing, security, and/or failure recovery). According to some embodiments, the ISP 504b may be in communication with (and/or comprise) the external router cluster 506. The external router cluster 506 may route certain requests, calls, and/or transmissions (and/or users—e.g., based on credentials and/or other information) through the EXTFW-RTR VLAN 504c and/or through the external firewall cluster 508a, for example, and/or may route certain requests, calls, and/or transmissions (and/or users—e.g., based on credentials and/or other information) through the Internet VLAN 504d and/or through the internal firewall cluster 508b.

In the case that a user (not shown) of the user device 502 comprises an online game player, consumer, and/or other member of the public, for example, the external router cluster 506 may direct communications through the EXTFW-RTR VLAN 504c and/or through the external firewall cluster 508a. In the case that the user of the user device 502 comprises a programmer, tester, employee, and/or other agent of a game provider and/or other entity that operates the system 500, for example, the external router cluster 506 may direct communications through the Internet VLAN 504d and/or through the internal firewall cluster 508b. In some embodiments, access via either or both of the external firewall cluster 508a and/or the internal firewall cluster 508b may permit the user device 502 to communicate via the INT-EXT VLAN 504e. The INT-EXT VLAN 504e may, for example, provide access to the content switches 522a which may, in some embodiments, serve content from any or all of the servers 510a-j to the user device 502, as is or becomes appropriate or desired. In some embodiments, the content switches 522a may communicate with the first spare server pool 510b via the web LAN 504f.

According to some embodiments, private and/or other specialized access to the system 500 via the internal firewall cluster 508b may permit the user device 502 to communicate via one or more of the database VLAN 504g, the application VLAN 504h, and/or the admin VLAN 504i. The database VLAN 504g may be utilized, for example, to access and/or communicate with the database servers 510d. In some embodiments, the application VLAN 504h may be utilized to access and/or communicate with any or all of the hydra servers 510e, the game controllers 510f, and/or the ruby servers 510g.

The admin VLAN 504i may allow, promote, conduct, facilitate, and/or manage a wide variety of communications within the system 500. The admin VLAN 504i may, for example, communicatively connect and/or couple any or all of the firewalls 508a-b, the servers 510a-j, the switches 522a-d, the TC device 524, the SAN storage 540, and/or the PDU devices 552. The user device 502 may be utilized, in conjunction with the admin servers 510h and/or via the admin VLAN 504i for example, to define, edit, adjust, manage, and/or otherwise access settings (and/or data) of the firewalls 508a-b, any or all of the switches 522a-d, the TC device 524, and/or the PDU devices 552. In some embodiments, the user device 502 (and/or the admin servers 510h) may be utilized to manage and/or access content, rules, logic (e.g., auto play logic), settings, and/or performance characteristics or preferences for any or all of the servers 510a-j.

In some embodiments, the server cluster 510a may comprise one or more servers and/or other electronic controller devices (e.g., blade servers) configured to provide online gaming data (e.g., interfaces (such as the example interface 720 of FIG. 7A, FIG. 7B, and/or FIG. 7C herein), automated game play decisions, outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, automatic game play decisions, outcomes, results, graphics, sounds, and/or other data or media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a*-*j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a*-*j* (e.g., via the Internet 504*a*) may conduct (in whole or in part), facilitate, and/or otherwise be associated with execution of one or more stored procedures, applications, processes, and/or methods (e.g., the methods 600, 800 of FIG. 6 and/or FIG. 8 herein, and/or one or more portions thereof) as described herein. In some embodiments, the user device 502 in conjunction with one or more of the servers 510*a*-*j* may facilitate the execution of procedures, applications and processes that differ between different user devices 502 (not shown explicitly/separately in FIG. 5), creating different gaming experiences for two players, even if playing the same game, in the same game session, etc.

Figure 6:
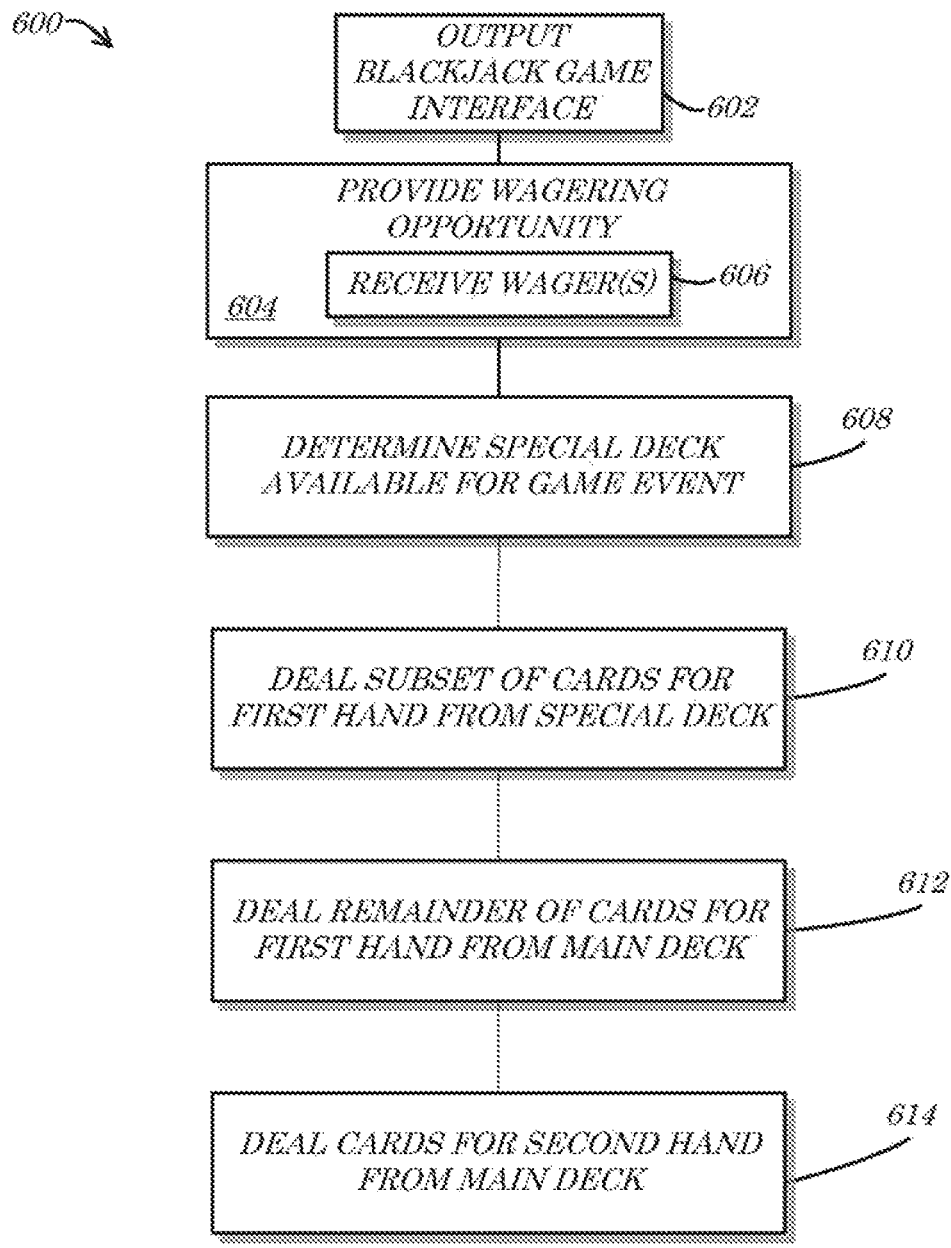
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or computerized processing devices (e.g., the player and/or user devices 102*a*-*n*, 202*a*-*n*, 302*a*-*b*, 402, 502 and/or the servers, apparatus, and/or controller devices 110, 210*a*-*n*, 310*a*-*g*, 410*e*-*f*, 510*a*-*j*, 810, 910 of FIG. 1, FIG. 2, FIG. 3, FIG. 4, FIG. 5, FIG. 9, and/or FIG. 10 herein), specialized computers, computer terminals, personal or mobile devices, tablets, computer servers, kiosks, LCD or LED touch-screens, computer systems and/or networks, and/or any combinations thereof (e.g., by one or more online game providers and/or online gaming player processing devices). In some embodiments, the method 600 may be embodied in, facilitated by, and/or otherwise associated with various input mechanisms and/or interfaces (such as the example interfaces of FIG. 7A, FIG. 7B, and/or FIG. 7C herein). In some instances, the description of a step of method 600 may refer, for illustrative purposes only, to a feature or element illustrated in FIG. 7A, FIG. 7B, FIG. 7C, FIG. 9A, FIG. 9B and/or FIG. 9C.

The process and/or flow diagrams described herein do not necessarily imply a fixed order to any depicted actions, steps, and/or procedures, and embodiments may generally be performed in any order that is practicable unless otherwise and specifically noted. In some embodiments, although a fixed order is not generally implied, the various components, steps, or procedures of a given method as disclosed herein may be specifically implemented in the order depicted and/or procedures, steps, or components shown following another procedure, step, or component may be performed and/or triggered in response to one or more previously-depicted and/or connected procedures, steps, or components. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

According to some embodiments, the method 600 may comprise outputting (e.g., by a processing device and/or via an output device and/or electronic communications network device) a blackjack game interface, at 602. In other embodiments that involve another type of card game, the interface that is output may be another game type interface (e.g., an online poker, video poker or baccarat game interface). The blackjack game interface (e.g., the interface 700 of FIG. 7A, FIG. 7B, and/or FIG. 7C herein) may, for example, be output or caused to be output by a transmittal of one or more interface initiation and/or configuration commands from a central server to a remote mobile device of a player. The commands may define or identify, for example, various graphical elements of the interface and/or information defining various positioning, formatting, and/or behavior characteristics of the elements. The transmitted commands may, for example, define how a blackjack table (e.g., a virtual table) should be displayed and/or populated on a particular screen of the remote mobile device (similarly, if the game being played is a poker game, the transmitted commands may define how a poker table should be displayed and/or populated). According to some embodiments, the outputting may comprise and/or be preceded or triggered by a signal received from the remote mobile device. The remote mobile device may transmit, and the central server device may receive for example, a signal defining or identifying parameters of the display of the remote mobile device, e.g., a device type (such as manufacturer, model, and/or serial number or, MAC address), a screen type, and/or screen characteristics such as pixel or other dimensions (e.g., actual physical pixels and/or rendered pixels, e.g., four hundred and fourteen by six hundred and twenty-eight (414×628) pixels, screen dimensions such as three by four (3×4) inches, or a diagonal screen measurement such as five and one half (5.5) inches diagonally). The interface components for rendering an image of the blackjack table or blackjack game interface elements may then, for example, be calculated or selected (e.g., from a pre-calculated set) to fit the given screen size/parameters. The commands transmitted back to the remote mobile device may then accordingly provide for an output of the interface that fits within the given "real estate" for the display device of the remote mobile device.

In some embodiments, the method 600 may comprise providing (e.g., by the processing device and/or via the electronic communications network device), a wagering opportunity, at 604. The interface output at 602, for example, may comprise one or more input components or elements (e.g., a virtual "wager" button) that allow a player to enter or define a wager for a particular session of a blackjack game. Interface 700 of FIG. 7A comprises one non-limiting example of a blackjack game interface that may be output in step 602 and element 708 thereof, which comprises an area of the screen in which virtual wagering chips of various denominations (each such chip representing an available wager amount), comprises an example manner in which a wagering opportunity virtual wager "button" may be output in such an interface).

According to some embodiments, the method 600 may comprise receiving (e.g., by the processing device and/or via the electronic communications network device), wagers, at 606. An indication may be received from a player device and/or via a network, for example, such indication being descriptive of a desire of a particular player (e.g., identified by a particular player identifier and/or associated (e.g., uniquely) with a particular player account) to place a wager in or for a game event (e.g., hand) of a blackjack game. In some embodiments, the indication may be received upon and/or in response to an activation of or interfacing with, by the player, an interface component provided (e.g., at 604) with respect to a wagering opportunity. Activation of the component by the player may, for example, cause a signal to be transmitted from a remote and/or mobile electronic player device utilized by the player, such signal being addressed and/or directed to the processing device (e.g., a gaming server). According to some embodiments, the signal may comprise an indication and/or definition of a wager amount, a player identifier (e.g., player account number, IP address, MAC address, etc.), a time stamp, and/or one or more designated or desired blackjack positions upon which the wager should be placed (e.g., in an embodiment in which a blackjack table offers more than one player position). In some embodiments, any timestamp provided with the wager placement signal may be utilized to sort, identify, and/or filter wagers based on when they were placed by a player (e.g., as opposed to when they were received; e.g., to account for network latency issues). Returning to the illustrative and non-limiting example of interface 700 of FIGS. 7A-7C, interface 700B of FIG. 7B illustrates that the player has chosen to place a "100" wager (e.g., $100USD or £100) on the current game event (as illustrated by the "100" chip being displayed in area 712 of the interface) and it may be assumed that the player did so by selecting the "100" chip from area 708 of interface 700A and that this selection caused a processor of the gaming system with which the player device is communicating to have received and registered the appropriate value as the wager for the current game event.

In accordance with some embodiments, the method 600 may comprise determining or identifying that a special deck should be utilized to deal or otherwise provide at least one card for the current game event (608). A game event, player and/or wager may be determined to qualify for use of a special deck based on various considerations (e.g., depending on the preference or goals of the game provider). For example, in one embodiment, only wagers that are of at least a minimum value allow for a special deck to be utilized for a game event corresponding to the wager. In another embodiment, a special deck may be utilized if the player pays a fee (whether in the form of a predetermined magnitude wager or a separate fee) for access to the special deck. In yet another embodiment, a player may win access to a special deck as a result of a game event (e.g., if a player obtains a certain outcome or symbol in a first game event, a card for a subsequent hand or game event may be dealt to the player from a special deck). In yet another embodiment, a player may earn access to, or qualify for use of, a special deck over a course of a plurality of game events or hands (e.g., the player may qualify to have a card dealt from a special deck if one or more of the following conditions are determined to be true: (i) a physical characteristic of a card dealt to a player (in the present or a previous game event) satisfies a certain rule (e.g., the color of the card back of the waiting card in the shoe is a predetermined color); (ii) the player has experienced a winning streak over the course of a few previous games; (iii) the player has experienced a losing streak over the course of a few previous games; (iv) the dealer has obtained a blackjack in the previous game event; (v) the dealer has busted in the previous game event; (vi) the player busted in the previous game (or in a certain number of hands within X game events); (vii) a random determination that the next game event qualifies for use of a special hand. It should be noted that if the player qualifies to use a special deck for a game event in accordance with any of the embodiments described above, the player may or may not additionally be required to fund the use of the special deck via a minimum wager, a side bet and/or a special fee.

Thus, it should be understood that, in at least some embodiment, any additional cost or risk to a gaming establishment from a higher probability and/or frequency of winning may be funded by having the player place an additional wager, a larger wager, a side bet or an additional fee over the course of one or more hands and/or by requiring the player to play for a certain amount of time, over a course of a certain amount of game events (e.g., by counting the number of game events or indirectly by requiring the player to achieve a certain number of particular outcomes, which in turn requires the player to play the game over a plurality of hands). In yet another embodiment, any additional cost or risk to a gaming establishment from a higher probability and/or frequency of winning resulting from the use of a special deck may be funded by a post-game tax on winnings.

In some embodiments, more than one type of special deck may be available for use in a certain game event. In such embodiments, method 600 may further provide for selecting one of the special decks (e.g., based on an input from a player, randomly, based on a characteristic of the player, game event, or wager, etc., or in accordance with a rule of the game).

In accordance with at least some embodiments, once it is determined that a special deck is available for a game event (and, in embodiments in which more than one special deck is available, a particular special deck is selected), the method 600 provides for dealing a subset of cards for a first hand (e.g., a player or dealer hand in a blackjack game, a hand of a player who has placed the wager determined in 606, or an opponent player, in a game of poker) from the special deck (610). In accordance with some embodiments, a special deck (e.g., a restricted card) may be utilized to deal, select or otherwise provide a subset (e.g., one) of cards for a hand of a card game while a conventional or main deck is utilized to deal, select or otherwise provide the remainder of the cards for that hand. Thus, in at least some embodiments, some but not all of the cards for a particular hand are dealt from a special deck so as to provide to a player wagering on the game event (the result of which wager is dependent on the final cards comprising that hand) while the remainder of the cards for that particular hand are dealt from a conventional deck. The selection or dealing of the cards from the special deck may, in accordance with some embodiments, be a random process (e.g., done based on an output of an RNG) but the cards comprising the special deck from which the at least one card for the hand is selected are ones that provide an advantage to the player wagering on the event. For example, as described herein, the special deck may comprise a high value restricted deck that includes only high value cards (e.g., if the hand for which the cards are being dealt is a player hand in a blackjack game) or the special deck may comprise a low value restricted deck that includes only low value cards (e.g., if the hand for which the cards are being dealt is a dealer hand in a blackjack game).

In accordance with one embodiment, step 610 may comprise the processing device communicating with, controlling, requesting an output from and/or comprising, for example, an RNG utilized to generate random (or pseudo-random) numbers that are mapped to various playing card values and/or suits. According to some embodiments, dealing cards from a special deck in an online or other electronic game may comprise activating or communicating with the RNG to generate cards utilizing a first algorithm, probability table or data set comprising the special deck.

According to some embodiments, the method 600 may comprise dealing the remainder of cards (for the hand for which the at least one card was dealt from the special deck in 610) from a conventional or main deck (612). In blackjack, this may comprise dealing the second card (or third, if a third card is selected) for the player or dealer hand (whichever hand the at least one card was dealt to in 610) utilizing cards comprising a conventional deck. In accordance with one embodiment, step 612 may comprise the processing device communicating with, controlling, requesting an output from and/or comprising, for example, an RNG utilized to generate random (or pseudo-random) numbers that are mapped to various playing card values and/or suits. According to some embodiments, dealing cards from a conventional deck in an online or other electronic game may comprise activating or communicating with the RNG to generate cards utilizing a second algorithm, second probability table or second data set comprising the conventional deck (the card(s) from the special deck having been generated or dealt using the first algorithm, probability table or data set, as described with respect to step 610). While in some embodiments the same RNG may be utilized to deal both the card(s) from the special deck and the card(s) from the conventional deck for the first hand (although, as just described, the RNG may utilize distinct algorithms, probability tables and/or data sets depending on whether the card(s) are being dealt from the special deck or the conventional deck), in other embodiments separate/distinct RNGs may be utilized, communicated with and/or controlled for each.

In accordance with some embodiments in which the game event comprises dealing cards for more than one hand (e.g., a blackjack or baccarat game for which both a dealer hand and a player hand are dealt or a poker game for which a hand is dealt to both the player associated with the wager received in 606 and the first hand for which cards were dealt in 610 and 612 as well as a hand for an opponent player), the method 600 may further comprise dealing the cards for the one or more additional cards from the conventional or main deck (614). Dealing cards from the conventional or main deck in step 614 may be similar to that described with respect to step 612 (e.g., the second algorithm, second probability table and/or second data set may be utilized and/or the second RNG may be utilized). In embodiments in which a player (or dealer or an opponent player) may elect to have additional cards deal (e.g., the player and/or dealer selects a "hit", for example), the method 600 may provide for dealing any additional cards requested based on such decision from the conventional deck (in some embodiments, it may be determined that an additional card should be dealt from the special deck).

According to some embodiments, the method 600 (or a separate method or subroutine) may further provide for resolving game event by determining the outcome of the first hand based on the cards comprising the first hand, the wager and the rules of the game and output a payout to the player if one is due. For example, for a game of blackjack each hand dealt for the game event may be evaluated to determine the blackjack outcome. Individual card values for each hand/position may be summed, for example, to determine a total hand/position value. In some embodiments, any hand values of twenty-one (21) or lower may be ranked in order from highest to lowest, with hand values above twenty-one (21) being discarded, disqualified, or tagged as a "bust". According to some embodiments, the ranked and/or sorted hands may be evaluated to determine one or more game results. The "player" positions may typically be compared to the dealer position, for example, to determine whether any particular "player" position is a winner. Any winning hands/positions may be evaluated to determine a corresponding result, e.g., based on any placed wagers.

The following is one example and non-limiting embodiment of game rules/parameters and mathematical models that may be utilized to provide an online game of blackjack in accordance with some embodiments described herein.

Example Blackjack Game Rules

NUMBE DECKS: 8
DEALER PEAK: YES
DEALER HIT S17: NO
DOUBLE AFTER
SPLIT: YES
MAX HANDS: 4
RESPLIT ACES: NO
HIT SPLIT ACES: NO
BLACKJACK PAY: 3 TO 2
DOUBLE ANY 2
CARDS: YES
Special Deck Availability: Player can pay an additional cost to be dealt a card from a special deck consisting only of: 9, 10, J, K, Q, A (e.g., a high value restricted deck). In some implementations this option is available to a player for any hand/game event while in other embodiments it is only sometimes available (e.g., if the player qualifies for this option in any of the manners described herein).
Special Deck cost: Player is charged an additional fee for using the special deck in a game event, such as a percentage (e.g., 20% or 50%) on top of the regular wager the player has placed on the outcome of the game event.
In the event of a blackjack win, for a game event in which the special deck was used, player will be returned the additional fee or percentage that the player paid (e.g., the 20% or the 50%). In other configurations, the fee (e.g., 20% or 50% paid for use of the special deck) may not be returned to the player regardless of outcome (i.e., is kept by gaming provider even in the event of a player win), although it may be more likely that in a game designed to charge a relatively higher fee/percentage (e.g., 50%) for use of a special deck may be returned upon a player win.

In the event the player loses the wager, the player loses the wager amount and the additional fee (e.g., the 20% or 50% the player paid for using the special deck).

In the event of a push, the additional fee the player paid for use of the special deck may be left in play. In some embodiments, the additional fee is left in play only on a blackjack push while in other embodiments it is left in play on any push.

If the player uses the special deck, after they receive a card from the special deck the game resumes per a traditional format:

1. the dealer will be dealt a card from the conventional deck→
2. the player will be dealt a card from the standard deck→
3. the dealer is dealt a card face down from the standard deck.

In one example mathematical model, the return-to-layer (RTP) for a blackjack game utilizing a special deck in a game in which the special deck is used for each game event and a 20% fee on top of the regular wager amount is 99.853%, as compared to an RTP of 99.569% for a blackjack game that does not use a special deck. These RTP calculations assume the player is using basic strategy. For a player using perfect composition dependent strategy the RTP may be slightly higher.

Figure 7A:
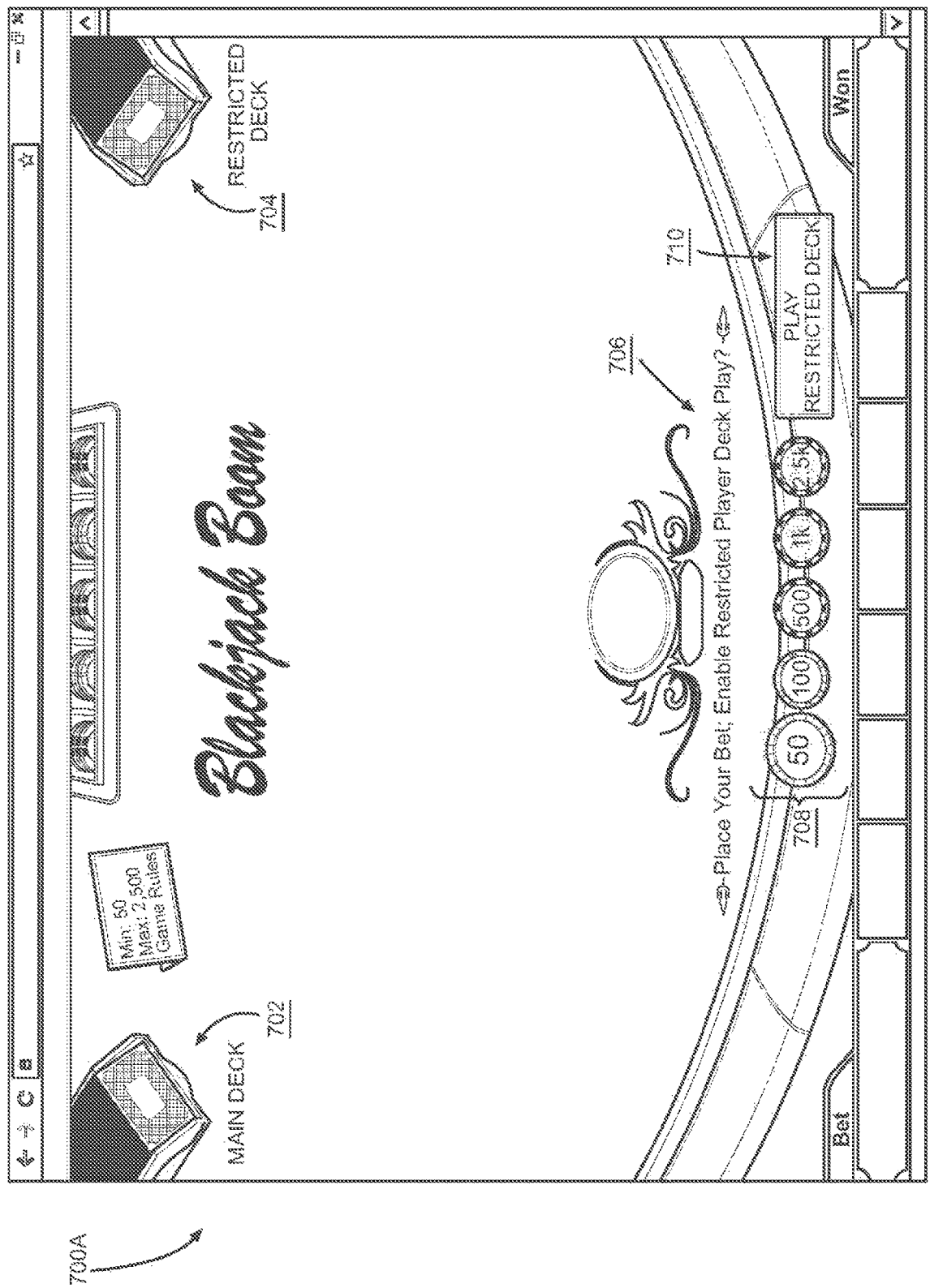
FIG. 7A, FIG. 7B, and FIG. 7C are illustrations of an example game interface according to some embodiments.
Figure 7B:
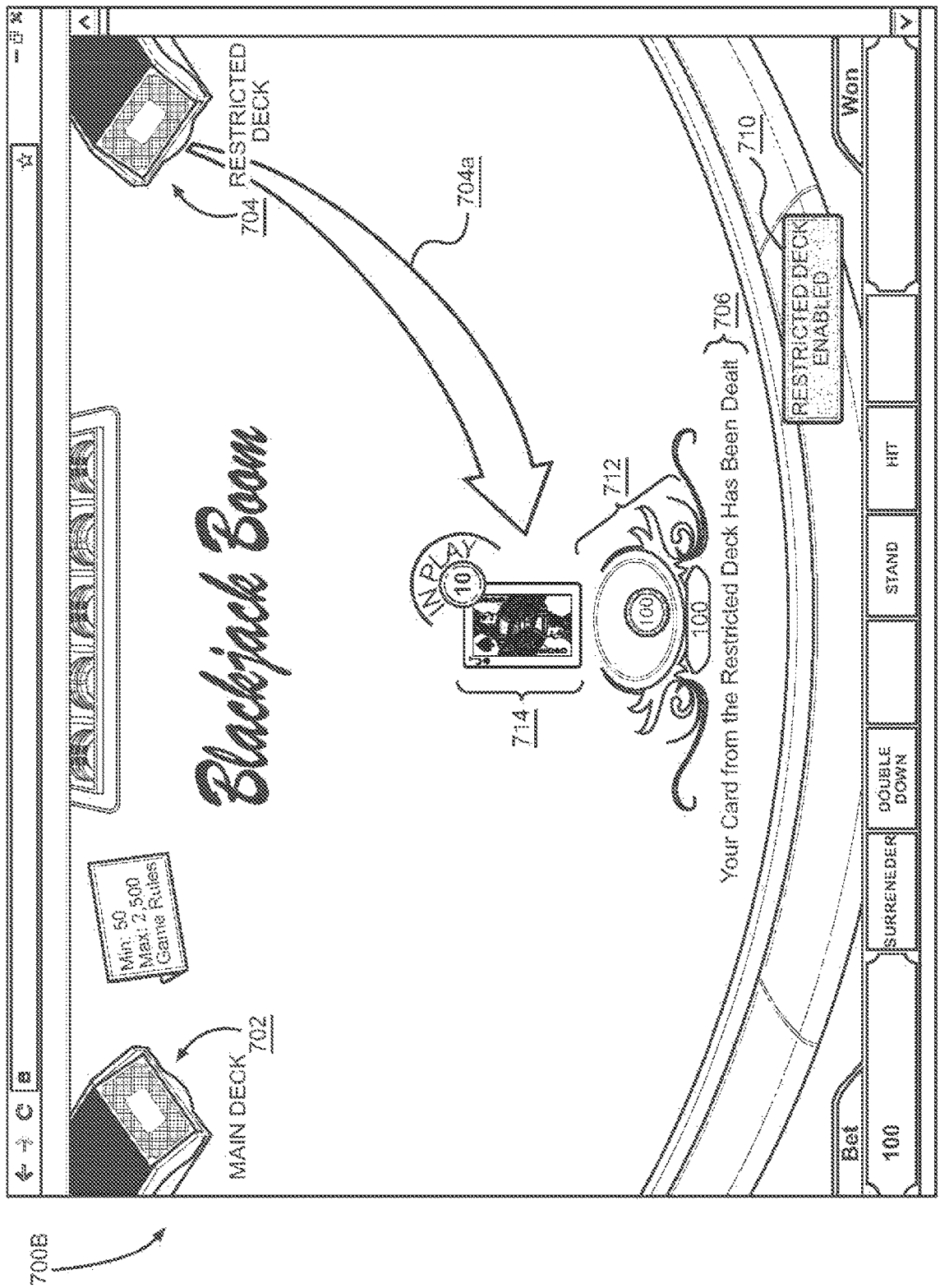
Figure 7C:
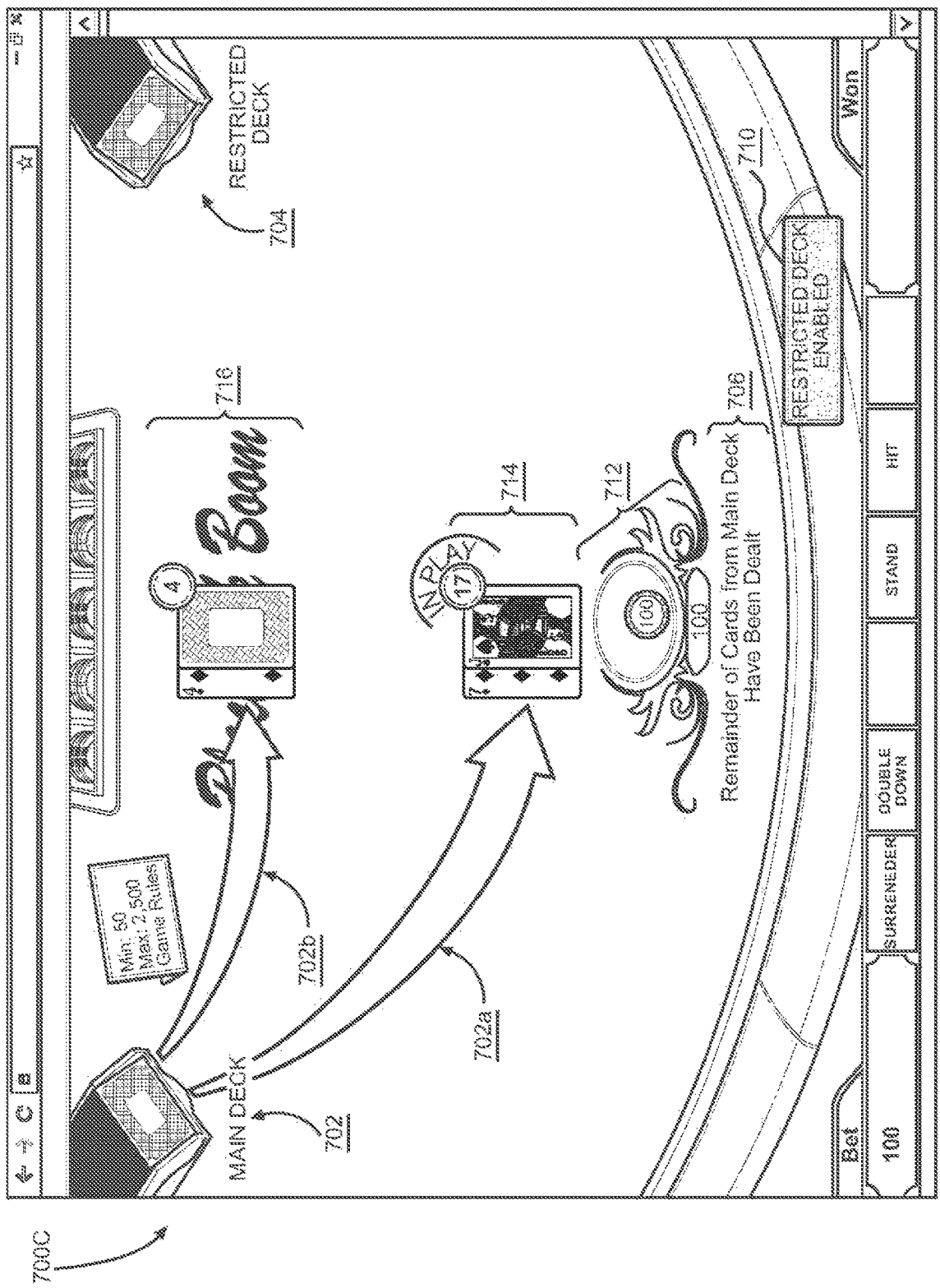
Figure 8A:
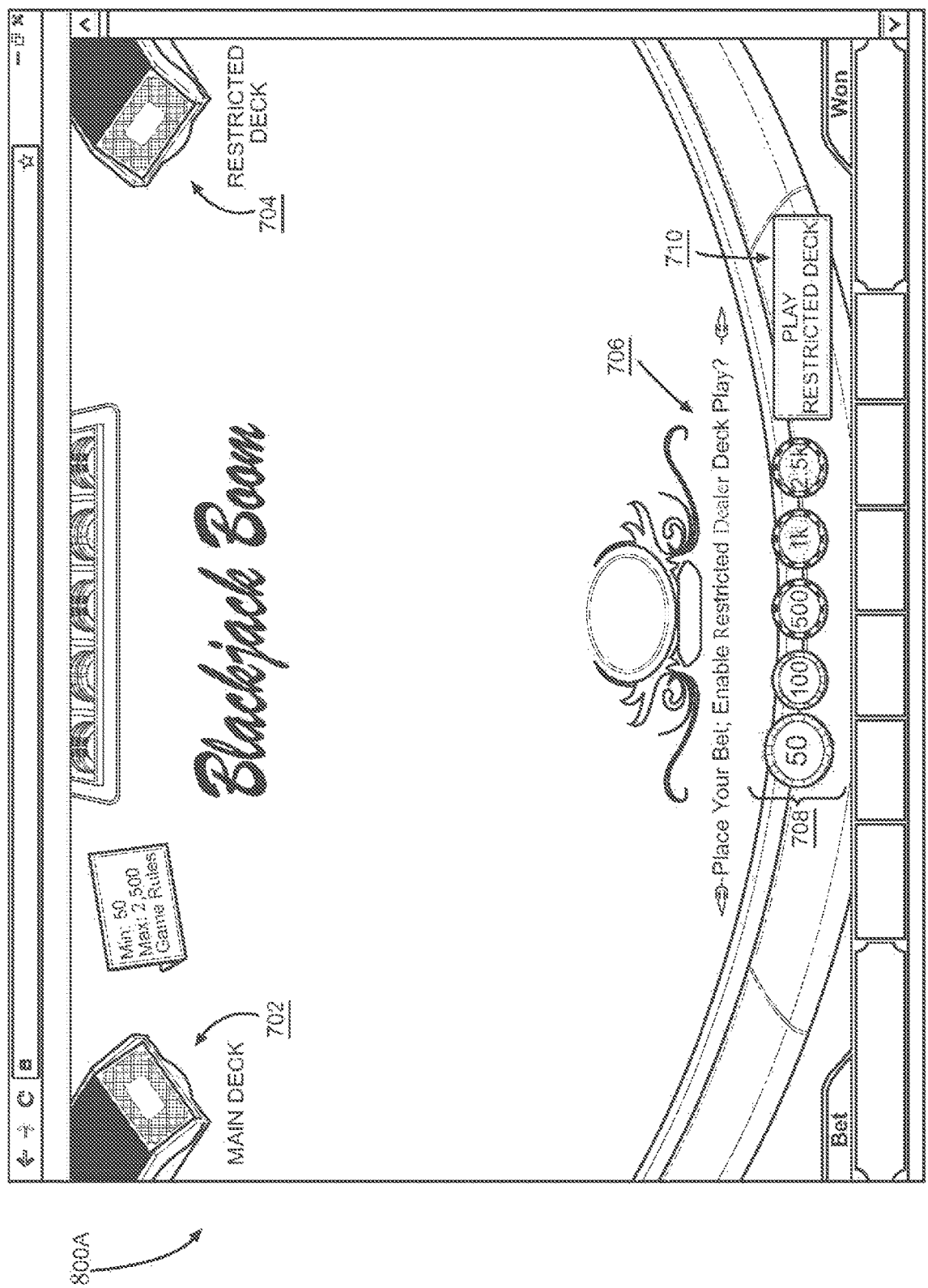
FIG. 8A, FIG. 8B, and FIG. 8C are illustrations of an example game interface according to some embodiments.
Figure 8B:
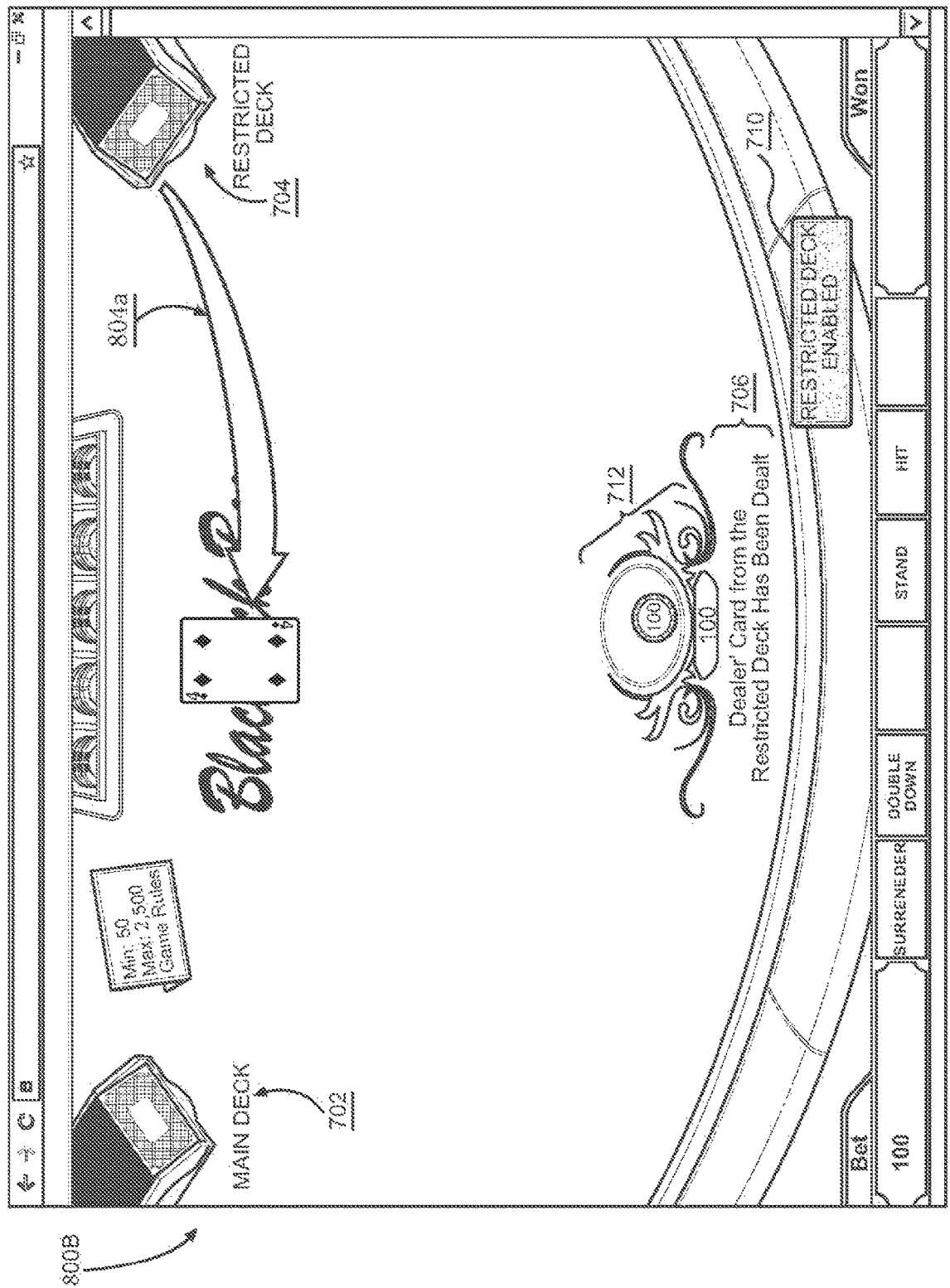
Figure 8C:
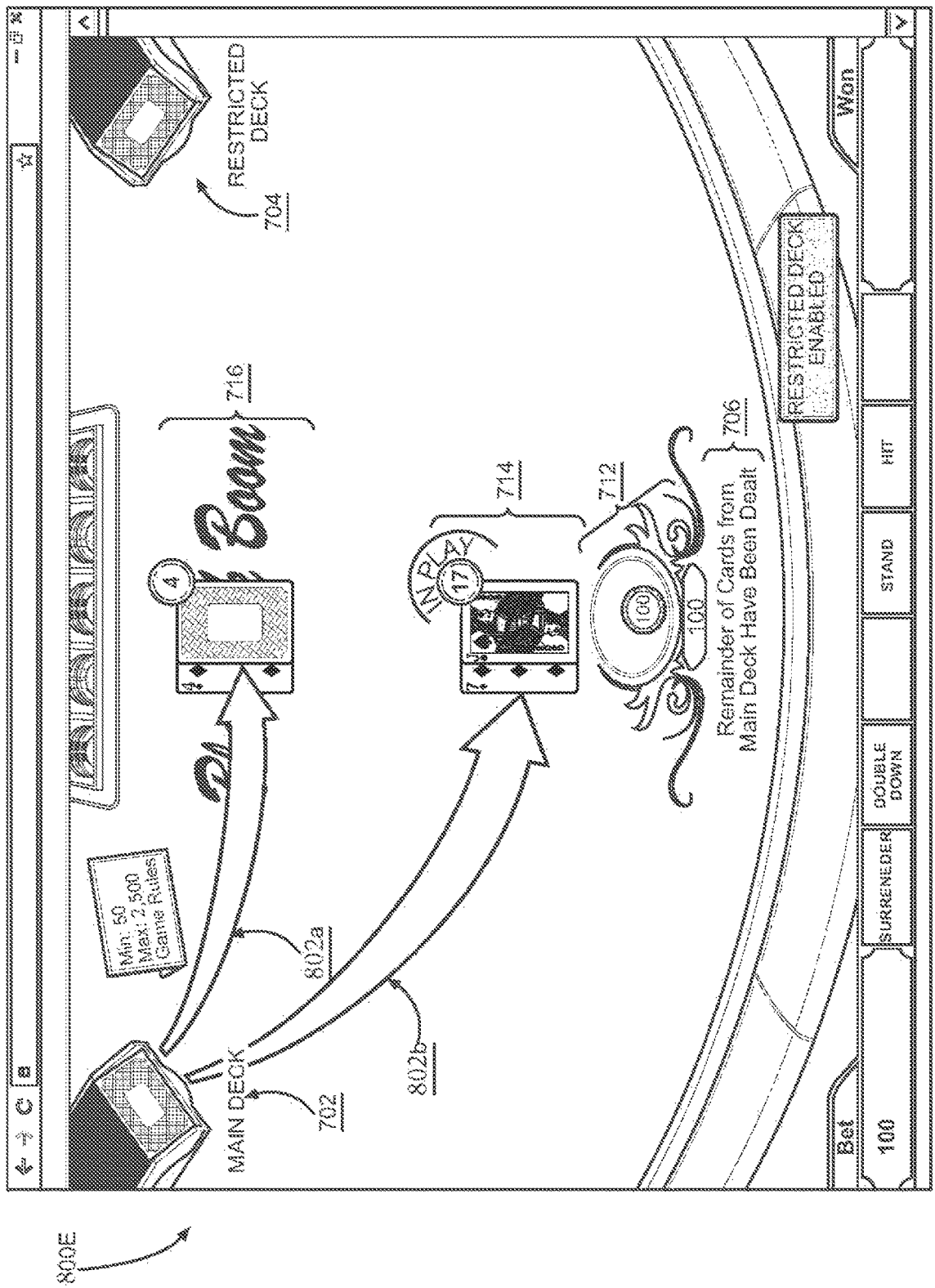

Turning now to FIGS. 7A-7C and FIGS. 8A-8C, example respective interfaces 700 and 800 according to some embodiments is shown. FIGS. 7A-7C illustrate how the interface 700 may be modified as an example blackjack game that utilizes a high value restricted deck for a player hand as game play progresses over the course of an example game event. FIGS. 8A-8C illustrate how the interface 800 may be modified as an example blackjack game that utilizes a low value restricted deck for a dealer hand as game play progresses over the course of an example game event. The screenshots of the game interface 700 as it is illustrated in FIG. 7A is referred to as GUI 700A herein, the screenshot of the game illustrated in FIG. 7B (illustrating the information output to a player at a particular moment in the example game subsequent to that shown in FIG. 7A) is referred to as GUI 700B herein, and the screenshot of the example interface 700 as it is illustrated in FIG. 7C (illustrating the information output to a player at a particular moment in the example game subsequent to that shown in FIG. 7B) is referred to as GUI 700C herein. GUI 700A, 700B and 700C are collectively referred to as interface 700 when reference is made to a feature or embodiment that applies to any or all of these GUIs. The screenshots of the game interface 800 as it is illustrated in FIG. 8A is referred to as GUI 800A herein, the screenshot of the game illustrated in FIG. 8B (illustrating the information output to a player at a particular moment in the example game subsequent to that shown in FIG. 8A) is referred to as GUI 800B herein, and the screenshot of the example interface 800 as it is illustrated in FIG. 8C (illustrating the information output to a player at a particular moment in the example game subsequent to that shown in FIG. 8B) is referred to as GUI 800C herein. GUI 800A, 800B and 800C are collectively referred to as interface 800 when reference is made to a feature or embodiment that applies to any or all of these GUIs.

In some embodiments, the interface 700 and/or 800 may comprise one or more of a web page, web form, database entry form, API, spreadsheet, table, and/or application or other GUI via which a player may interact with (e.g., place a wager in) a restricted deck blackjack game as described herein. The interface 700 and/or 800 may, for example, comprise a front-end of an online, social, network, and/or wagering game program (and/or portion thereof) and/or platform programmed and/or otherwise configured to execute, conduct, and/or facilitate the method 600 of FIG. 6 herein, and/or one or more portions and/or combinations thereof. In some embodiments, the interface 700 and/or 800 may be output via a computerized device (e.g., a processor or processing device) such as one or more of the player and/or user devices 102a-n, 202a-n, 302a-b, 402, 502, 802 and/or the servers, apparatus, and/or controller devices 110, 210a-n, 310a-g, 410e-f, 510a-j, 810, 910 of FIG. 1, FIG. 2, FIG. 3, FIG. 4, FIG. 5 and/or FIG. 9 herein. In some embodiments, the example interface 700 may comprise interface outputs of (and/or otherwise associated with) a GUI utilized to conduct and/or play a restricted deck blackjack game, such as may be implemented and/or provided as described herein. In some embodiments, the interface 700 and/or 800 may be output as part of a game play system.

In accordance with some embodiments, for example, a system for facilitating an electronic and/or online game of blackjack as described herein may comprise a blackjack game server which includes a processor and a memory storing rules for blackjack play.

The game event represented by the interface 700, as it may progress and cause modifications to the interface 700 and/or 800, may comprise a game event of a game of blackjack utilizing a restricted deck (a high value restricted deck for a player hand in the case of FIGS. 7A-7C and a low value restricted deck for a dealer hand in the case of FIGS. 8A-8C), in accordance with at least some embodiments described herein. In the present application, like reference numerals in the Figures refer to like elements. Thus, for example, the game interface 700 and/or 800, although it may display different data (e.g., different cards dealt to the various player positions or a result of the game event upon the resolution of the dealer hand and the player hand) as the game event progresses, is consistently referred to as game interface 700 in each of FIG. 7A, FIG. 7B and FIG. 7C and game interface 800 in each of FIG. 8A, FIG. 8B and FIG. 8C.

The concepts of restricted deck blackjack play may be implemented using an electronic representation of a blackjack table (which is illustrated in FIGS. 7A-7C and FIGS. 8A-8C, with appropriate data modifications to show progression of an example game event). Although in accordance with some embodiments, restricted deck play of blackjack may be offered as an electronic game (e.g., an online game) and FIGS. 7A-7C and FIGS. 8A-8C illustrate an electronic version of such a blackjack game, in other embodiments restricted deck blackjack play may be implemented on a physical blackjack table which may be laid out in a manner similar to that shown in FIGS. 7A-7C and FIGS. 8A-8C (although in some embodiments either an electronic or online version of the table or a physical version of the table may include multiple player positions).

Referring now to FIG. 7A in particular, illustrated therein is a screen shot of GUI 700A showing a "snapshot in time" taken during game play, at a time when a game event is still open for betting (i.e., the player position hands have not yet begun to be resolved and players may place a wager on the game event). Accordingly, area 708 is depicted as outputting an indication to a player of wager amounts that are available for placement on the next game event. Area 706 is depicted as indicating to the player an invitation to utilize a restricted deck for game play (in the present embodiment being illustrated in FIGS. 7A-7C, the restricted deck is to be utilized for dealing a card to a player hand). Virtual button 710 is an example mechanism via which the player may opt to enable restricted deck game play (in some embodiments the player may need to select this for each individual game event, while in other embodiments once the player selects this option it can remain enabled for subsequent game events until the player either un-enables the feature or ends his game session). In some embodiments, as described herein, the player may be charged a fee for utilizing a special or restricted deck. In such embodiments, the message displayed in area 706 and/or the virtual button 710 may indicate the fee to the player (e.g., "20% on top of the wager will be deducted from your credit balance if you select restricted deck game play"). In some embodiments, a restricted deck may be utilized for each game event and the player does not have an option to enable or disable this feature as it is part of the game design.

A representation of the main deck or shoe from which cards are dealt is illustrated in area 702 and a representation of the restricted deck from which cards may be dealt if the player enables restricted deck game play is illustrated in area 704. In some embodiments in which a player can enable or disable use of a restricted deck, a representation of the restricted deck may not be shown if the player does not enable restricted deck game play. In some embodiments, interface 700 may include additional information, such as a player's available credit balance, player identification number, etc.

Turning now to FIG. 7B, illustrated therein is a exemplary screen shot of the game interface 700 of FIG. 7A at a subsequent time, after the player has placed a wager and elected to enable restricted deck game play. Area 712 indicates that the player has placed a wager of 100 (also indicated in the lower bar under the "Bet" heading. The virtual button 710 indicates that restricted deck game play has been enabled. The arrow 704a indicates that a card has been dealt to the player's hand, which is illustrated in area 714, from the restricted deck represented in area 704. Area 714 also shows the current value of the player's hand, which is "10." Area 706 indicates to the player that a card from the restricted deck has been dealt. In some embodiments, an arrow 704a (or similar element indicating the dealing of the card) may be output to the player while in other embodiments this arrow or indication may be omitted.

Turning next to FIG. 7C, illustrated therein is an example screen shot of the game interface 700 of FIG. 7B at a subsequent time, after the remainder of cards have been dealt for the game event (assuming neither the dealer nor the player elects to have a third card dealt which, if it were deal and in accordance with some embodiments, would be dealt from the main deck). The arrow 702a indicates that a card has been dealt to the player's hand, which is illustrated in area 714, from the main deck represented in area 702. Area 714 also shows the current value of the player's hand, which is "17" after the addition of the 7 of diamonds to the Jack of spades that had previously been dealt to the player hand from the restricted deck. Arrow 702b shows that two cards have also been dealt to the dealer hand (illustrated in area 716) and that one of the cards is a 4 of diamonds (the other card currently being shown face down). Area 706 indicates to the player that the remainder of the cards for the current game event have been dealt from the main deck (as with respect to FIG. 7B, the arrows 702a and/or 702b may or may not actually be shown to the player). Although not illustrated in the interface 700 for purposes of brevity, the interface 700 may further be modified in a manner similar to play of a conventional blackjack game after this point. For example, the face down card of the dealer hand may be revealed, an indication of whether the player has won the wager may be output and a payout (in the event the player has won the wager) may be added to the player's credit meter balance. from the restricted deck has been dealt.

Referring now to FIGS. 8A-8C and FIG. 8A in particular, illustrated therein is a screen shot of GUI 800A showing a "snapshot in time" taken during game play, at a time when a game event is still open for betting (i.e., the player position hands have not yet begun to be resolved and players may place a wager on the game event). In accordance with one embodiment, although the game being depicted in FIG. 8A will deal a card from the restricted deck represented in area 704 to the dealer hand rather than the player hand, the initial interface presented to the player is the same as that depicted in FIG. 7A and thus the description thereof will not be repeated herein for purposes of brevity.

Turning now to FIG. 8B, illustrated therein is a exemplary screen shot of the game interface 800 of FIG. 8A at a subsequent time, after the player has placed a wager and elected to enable restricted deck game play. Area 812 indicates that the player has placed a wager of 100 (also indicated in the lower bar under the "Bet" heading). The virtual button 810 indicates that restricted deck game play has been enabled. The arrow 804a indicates that a card has been dealt to the dealer's hand from the restricted deck represented in area 704, the card dealt being a 4 of diamonds. As noted, the restricted deck being used to deal a card to the dealer hand is a low value restricted deck and thus a low value card has been dealt to the dealer hand, thus increasing the player's chances of winning the wager for the game event; this should be contrasted with the card dealt from the high value restricted hand to the player hand in FIG. 8A, which was a Jack, and also increased the player's chances of winning the wager for the hand but in a different manner. Area 706 indicates to the player that a card from the restricted deck has been dealt to the dealer. In some embodiments, an arrow 804a (or similar element indicating the dealing of the card) may be output to the player while in other embodiments this arrow or indication may be omitted.

Turning next to FIG. 8C, illustrated therein is an example screen shot of the game interface 800 of FIG. 8B at a subsequent time, after the remainder of cards have been dealt for the game event (assuming neither the dealer nor the player elects to have a third card dealt which, if it were deal and in accordance with some embodiments, would be dealt from the main deck). The arrow 802a indicates that a second card has been dealt to the dealer's hand, illustrated in area 716 as face down at this point in the game event, from the main deck represented in area 702. Area 716 also shows the current value of the dealer's hand, which is "4" at this point (and may only be as high as "15" since the highest value of the face down deck may be 11). Arrow 702b shows that two cards have also been dealt to the player hand (illustrated in area 714) and that the value of the player hand is "17". Area 706 indicates to the player that the remainder of the cards for the current game event have been dealt from the main deck (as with respect to FIG. 8B, the arrows 802a and/or 802b may or may not actually be shown to the player). Although not illustrated in the interface 800 for purposes of brevity, the interface 800 may further be modified in a manner similar to play of a conventional blackjack game after this point. For example, the face down card of the dealer hand may be revealed, an indication of whether the player has won the wager may be output and a payout (in the event the player has won the wager) may be added to the player's credit meter balance.

Figure 9:
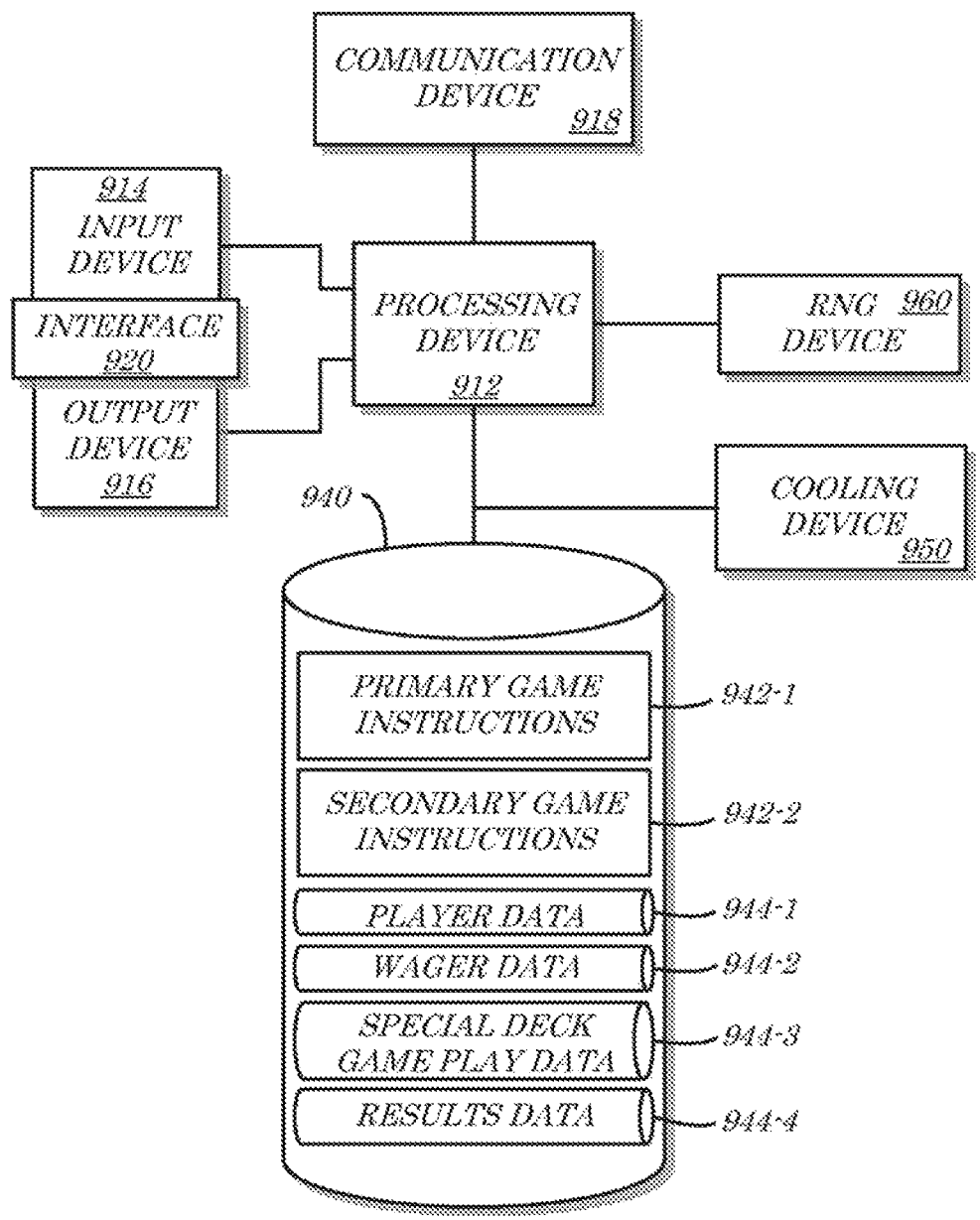
FIG. 9 is a block diagram of an apparatus according to some embodiments.
Figure 10A:
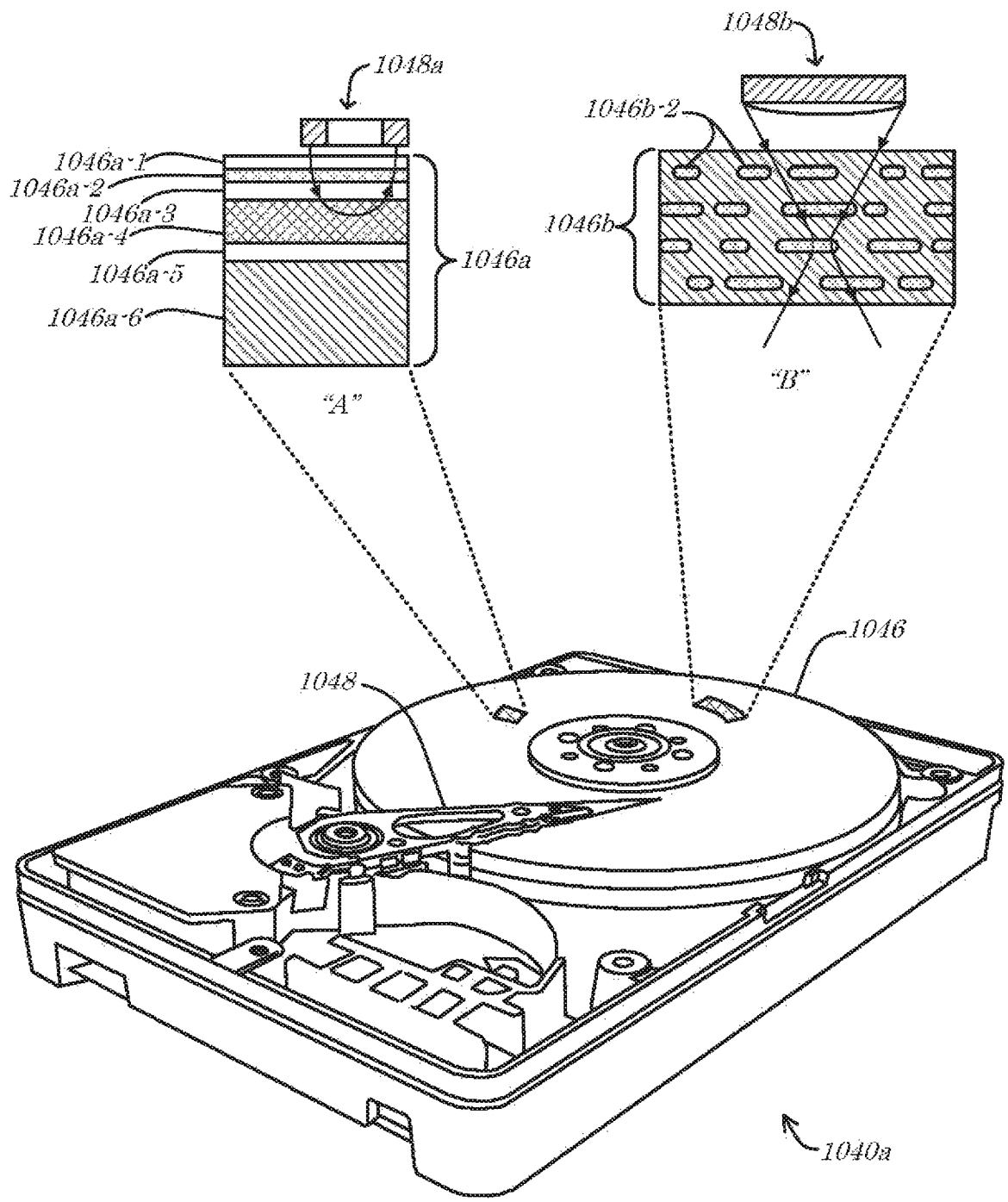
FIG. 10A, FIG. 10B, FIG. 10C, FIG. 10D, and FIG. 10E are perspective diagrams of exemplary data storage devices according to some embodiments.
Figure 10B:
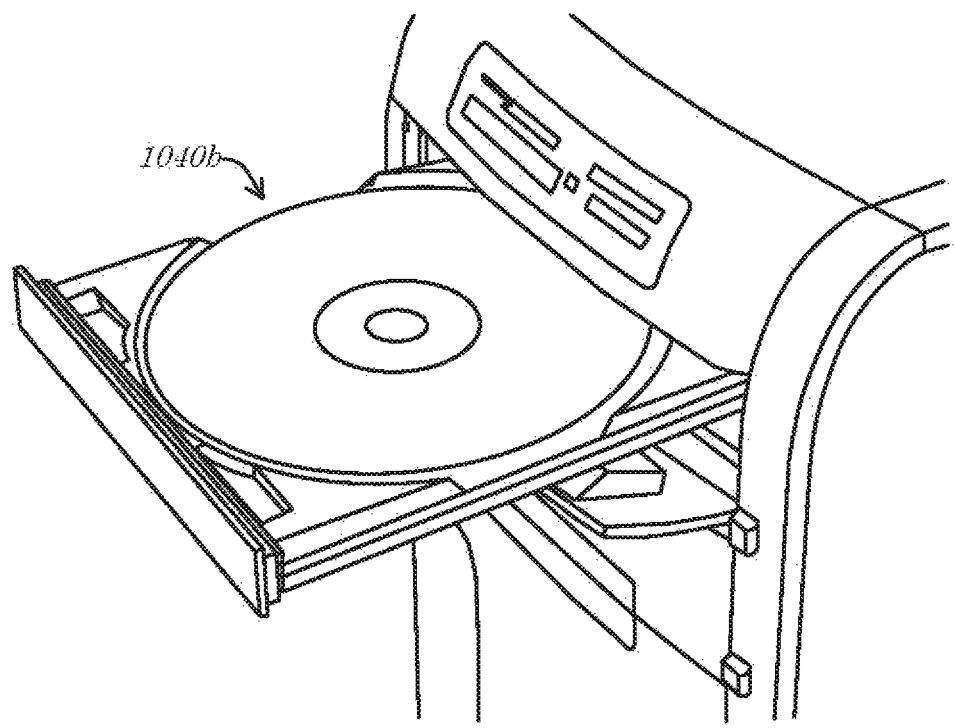
Figure 10C:
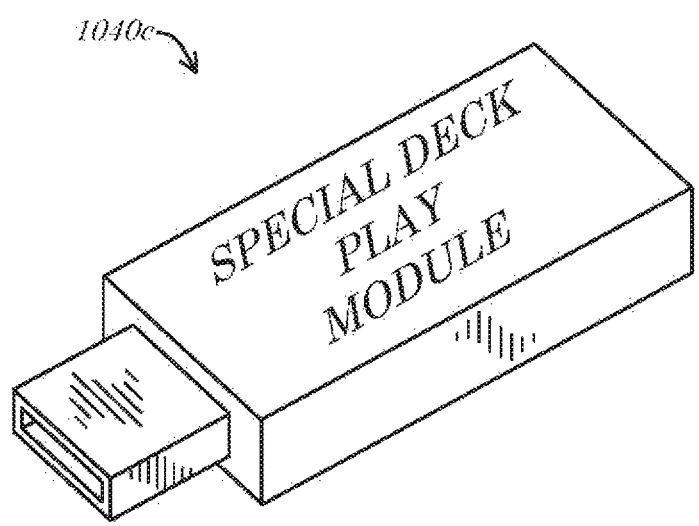
Figure 10D:
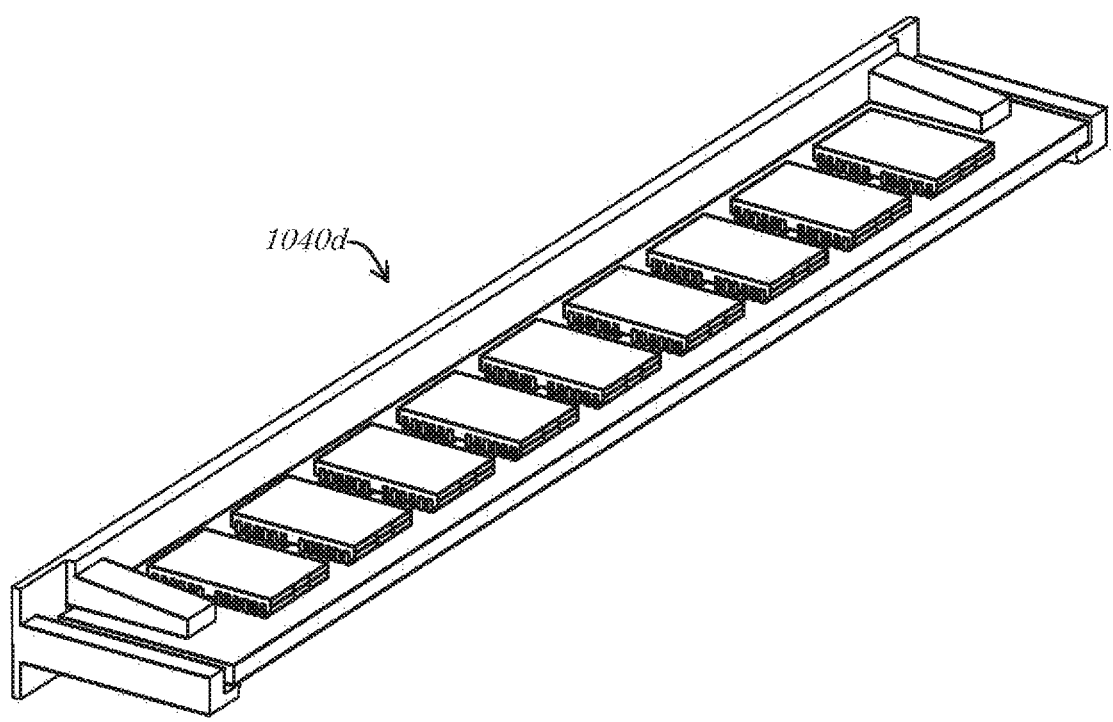
Figure 10E:
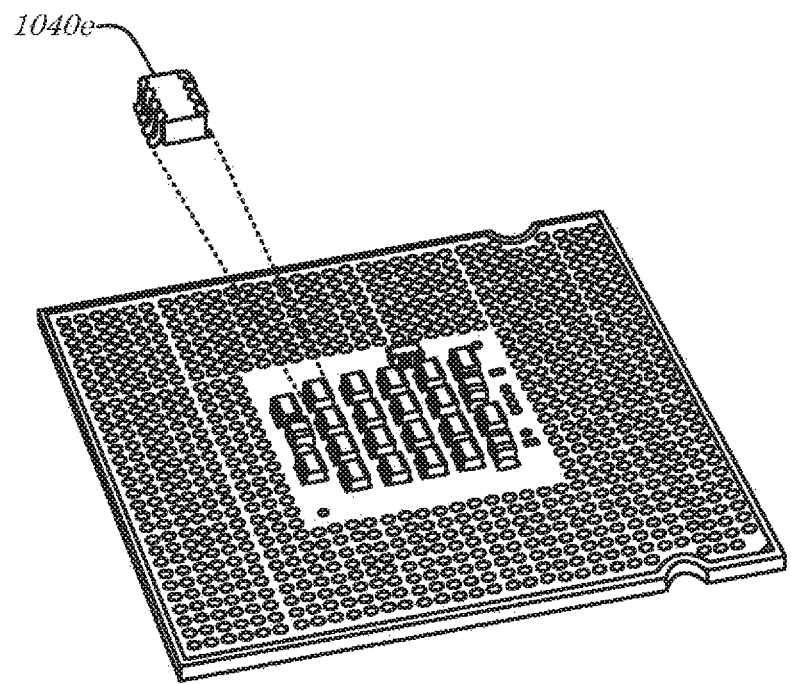

Referring now to FIG. 9, a block diagram of an apparatus 900 according to some embodiments is shown. In some embodiments, the apparatus 900 may be similar in configuration and/or functionality to any of the player and/or user devices 102a-n, 202a-n, 302a-b, 402, 502 and/or the servers and/or controller devices 110, 210a-n, 310a-g, 410e-f, 510a-j, 810 of FIG. 1, FIG. 2, FIG. 3, FIG. 4 ad/or FIG. 5, herein, and/or may otherwise comprise a portion of the systems 100, 200, 300, 400, 500 and/or the method 600 of FIG. 1, FIG. 2, FIG. 3, FIG. 4, FIG. 5 and/or FIG. 6 herein. The apparatus 900 may, for example, execute, process, facilitate, and/or otherwise be associated with the method 600 of FIG. 6 herein, and/or one or more portions and/or combinations thereof. In some embodiments, the apparatus 900 may comprise a processing device 912, an input device 914, an output device 916, a communication device 918, an interface 920, a memory device 940 (storing various programs and/or instructions 942 and data 944), a cooling device 950, and/or a Random Number Generator (RNG) 960. According to some embodiments, any or all of the components 912, 914, 916, 918, 920, 940, 942, 944, 950, 960 of the apparatus 900 may be similar in configuration and/or functionality to any similarly named and/or numbered components described herein. Fewer or more components 912, 914, 916, 918, 920, 940, 942, 944, 950, 960 and/or various configurations of the components 912, 914, 916, 918, 920, 940, 942, 944, 950, 960 be included in the apparatus 900 without deviating from the scope of embodiments described herein.

According to some embodiments, the processing device 912 may be or include any type, quantity, and/or configuration of electronic and/or computerized processor that is or becomes known. The processing device 912 may comprise, for example, an Intel® IXP 2800 network processor or an Intel® XEON™ Processor unit coupled with an Intel® E7501 chipset. In some embodiments, the processing device 912 may comprise multiple inter-connected units, processors, microprocessors, and/or micro-engines. According to some embodiments, the processing device 912 (and/or the apparatus 910 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 910 comprises a server such as a blade server, necessary power may be supplied via a standard AC outlet, power strip, surge protector, a PDU, and/or Uninterruptible Power Supply (UPS) device.

In some embodiments, the input device 914 and/or the output device 916 are communicatively coupled to the processing device 912 (e.g., via wired and/or wireless connections and/or pathways) and they may generally comprise any types or configurations of input and output components and/or devices that are or become known, respectively. The input device 914 may comprise, for example, a keyboard that allows an operator of the apparatus 910 to interface with the apparatus 910 (e.g., by a player, such as to place a wager in an automated communal play blackjack game as described herein). In some embodiments, the input device 914 may comprise a sensor configured to provide information such as player input (e.g., player wager decisions, an indication of whether the player wants to utilize a restricted deck, etc.) to the apparatus 902 and/or the processing device 912. The output device 916 may, according to some embodiments, comprise a display screen and/or other practicable output component and/or device. The output device 1016 may, for example, provide the interface 700 to a player (e.g., via a website, electronic communications network device, and/or non-authorized software application; e.g., the interface 7000 of FIG. 7A, FIG. 7B, and/or FIG. 7C herein). According to some embodiments, the input device 914 and/or the output device 916 may comprise and/or be embodied in a single device such as a touch-screen monitor (e.g., a device capable of both receiving input and providing output; e.g., via the interface 920).

In some embodiments, the communication device 918 may comprise any type or configuration of communication device that is or becomes known or practicable. The communication device 918 may, for example, comprise a Network Interface Card (NIC), a telephonic device, a cellular network device, a router, a hub, a modem, and/or a communications port or cable. In some embodiments, the communication device 918 may be coupled to provide data to a remote device (not shown in FIG. 9), such as in the case that the apparatus 900 is utilized to provide the interface 920 to a player as a client-side application of an online wagering game hosted by a remote server, as described herein. The communication device 918 may, for example, comprise a cellular telephone network transmission device that receives (and/or sends) signals indicative of game interface components to customer and/or subscriber handheld, mobile, and/or telephone device, e.g., from a remote server device. According to some embodiments, the communication device 918 may also or alternatively be coupled to the processing device 912. In some embodiments, the communication device 918 may comprise an IR, RF, Bluetooth™, NFC, and/or Wi-Fi® network device coupled to facilitate communications between the processing device 912 and another device (such as a third-party device, not shown).

The memory device 940 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 940 may, according to some embodiments, store one or more of primary game instructions 942-1, secondary (e.g., bonus) game instructions 942-2, player data 944-1, wager data 944-2, special deck game play data 944-3, and/or results data 944-4. In some embodiments, the primary game instructions 942-1, secondary game instructions 942-2, player data 944-1, wager data 944-2, special deck game play data 944-3, and/or results data 944-4 may be utilized by the processing device 912 to provide output information via the output device 916 and/or the communication device 918.

According to some embodiments, the primary game instructions 942-1 may be operable to cause the processing device 912 to process player data 944-1, wager data 944-2, special deck game play data 944-3, and/or results data 944-4. Player data 944-1, wager data 944-2, special deck game play data 944-3, and/or results data 944-4 received via the input device 914 and/or the communication device 918 may, for example, be analyzed, sorted, filtered, decoded, decompressed, ranked, scored, plotted, and/or otherwise processed by the processing device 912 in accordance with the primary game instructions 942-1. In some embodiments, player data 944-1, wager data 944-2, special deck game play data 944-3, and/or results data 944-4 may be fed by the processing device 912 through one or more mathematical and/or statistical formulas and/or models in accordance with the primary game instructions 942-1 to provide an online or electronic casual or wagering game, such as an online restricted deck blackjack game or other type of card game, in accordance with embodiments described herein.

In some embodiments, the secondary game instructions 942-2 may be operable to cause the processing device 912 to process player data 944-1, wager data 944-2, special deck game play data 944-3, and/or results data 944-4. Player data 944-1, wager data 944-2, special deck game play data 944-3, and/or results data 944-4 received via the input device 914 and/or the communication device 918 may, for example, be analyzed, sorted, filtered, decoded, decompressed, ranked, scored, plotted, and/or otherwise processed by the processing device 912 in accordance with the secondary game instructions 942-2. In some embodiments, player data 944-1, wager data 944-2, special deck game play data 944-3, and/or results data 944-4 may be fed by the processing device 912 through one or more mathematical and/or statistical formulas and/or models in accordance with the secondary game instructions 942-2 to provide an online or electronic casual or wagering game in addition to a base or primary game. For example, in one embodiment a player may be playing a primary game in accordance with primary game instructions 942-1 and as a result of that game win an opportunity to play using a restricted deck (e.g., a restricted deck blackjack game, using a restricted deck for at least one of the player hand or the dealer hand) and the special deck game play may be conducted using the secondary game instructions 942-2.

Any or all of the exemplary instructions and data types described herein and other practicable types of data may be stored in any number, type, and/or configuration of memory devices that is or becomes known. The memory device 940 may, for example, comprise one or more data tables or files, databases, table spaces, registers, and/or other storage structures. In some embodiments, multiple databases and/or storage structures (and/or multiple memory devices 940) may be utilized to store information associated with the apparatus 910. According to some embodiments, the memory device 940 may be incorporated into and/or otherwise coupled to the apparatus 900 (e.g., as shown) or may simply be accessible to the apparatus 900 (e.g., externally located and/or situated).

In some embodiments, the apparatus 900 may comprise the cooling device 950. According to some embodiments, the cooling device 950 may be coupled (physically, thermally, and/or electrically) to the processing device 912 and/or to the memory device 940. The cooling device 950 may, for example, comprise a fan, heat sink, heat pipe, radiator, cold plate, and/or other cooling component or device or combinations thereof, configured to remove heat from portions or components of the apparatus 910.

According to some embodiments, the apparatus 910 may comprise the RNG 960. The RNG 960 may comprise, for example, a specially-configured device and/or module for generating random (or pseudo random) numbers, e.g., in accordance with applicable regulations pertaining to gambling or wagering activities. The RNG 960 may comprise, for example, a secure and/or tamper resistant (or tamper evident) module that is inspected and/or approved by a regulatory entity for generating random outcomes for online wagering games.

Referring now to FIG. 10A, FIG. 10B, FIG. 10C, FIG. 10D, and FIG. 10E, perspective diagrams of exemplary data storage devices 1040*a-e* according to some embodiments are shown. The data storage devices 1040*a-e* may, for example, be utilized to store instructions and/or data such as the primary game instructions 942-1, secondary game instructions 942-2, player data 944-1, wager data 944-2, special deck game play data 944-3, and/or results data 944-4, each of which is described in reference to FIG. 9 herein. In some embodiments, instructions stored on the data storage devices 1040*a-e* may, when executed by a processor, cause the implementation of and/or facilitate the method 600 of FIG. 6 herein, and/or portions and/or combinations thereof.

According to some embodiments, the first data storage device 1040*a* may comprise one or more various types of internal and/or external hard drives. The first data storage device 1040*a* may, for example, comprise a data storage medium 1046 that is read, interrogated, and/or otherwise communicatively coupled to and/or via a disk reading device 1048. In some embodiments, the first data storage device 1140*a* and/or the data storage medium 1046 may be configured to store information utilizing one or more magnetic, inductive, and/or optical means (e.g., magnetic, inductive, and/or optical-encoding). The data storage medium 1046, depicted as a first data storage medium 1046*a* for example (e.g., breakout cross-section "A"), may comprise one or more of a polymer layer 1046*a*-1, a magnetic data storage layer 1046*a*-2, a non-magnetic layer 1046*a*-3, a magnetic base layer 1046*a*-4, a contact layer 1046*a*-5, and/or a substrate layer 1046*a*-6. According to some embodiments, a magnetic read head 1046*a* may be coupled and/or disposed to read data from the magnetic data storage layer 1046*a*-2.

In some embodiments, the data storage medium 1046, depicted as a second data storage medium 1046*b* for example (e.g., breakout cross-section "B"), may comprise a plurality of data points 1046*b*-2 disposed with the second data storage medium 1046*b*. The data points 1046*b*-2 may, in some embodiments, be read and/or otherwise interfaced with via a laser-enabled read head 1048*b* disposed and/or coupled to direct a laser beam through the second data storage medium 1046*b*.

In some embodiments, the second data storage device 1040*b* may comprise a CD, CD-ROM, DVD, Blu-Ray™ Disc, and/or other type of optically-encoded disk and/or other storage medium that is or becomes known or practicable. In some embodiments, the third data storage device 1040*c* may comprise a USB keyfob, dongle, and/or other type of flash memory data storage device that is or becomes know or practicable. In some embodiments, the fourth data storage device 1040*d* may comprise RAM of any type, quantity, and/or configuration that is or becomes practicable and/or desirable. In some embodiments, the fourth data storage device 1040*d* may comprise an off-chip cache such as a Level 2 (L2) cache memory device. According to some embodiments, the fifth data storage device 1040*e* may comprise an on-chip memory device such as a Level 1 (L1) cache memory device.

The data storage devices 1040*a-e* may generally store program instructions, code, and/or modules (e.g., a combination of native instructions and downloaded and/or non-authorized software instructions) that, when executed by a processing device cause a particular machine to function in accordance with one or more embodiments described herein. The data storage devices 1040*a-e* depicted in FIG. 10A, FIG. 10B, FIG. 10C, FIG. 10D, and FIG. 10E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for restricted deck card games as described herein.

Certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed herein, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. § 101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

Various embodiments described herein provide advantages in computer processing. The number of online gaming transactions that can effectively be input, processed, and output in accordance with embodiments herein, for example, would not be possible without implementation of such embodiments in a specialized computer processing system. Such a system as described herein may, for example, enable processing of tens, hundreds, and/or thousands of gaming transactions in minutes, hours, or within a day, while such processing would not be possible in the absence of such a system. For convenience, such a specially-programmed system may be referred to herein as a "specialized computer processing system". In other words, embodiments conducted by a specialized computer processing system may not be possible to achieve in the absence of such a system and/or the speed at which such a system operates would simply not be reproducible by other available means. As a non-limiting example, a specialized computer processing system herein may be capable of receiving input descriptive of, processing, and outputting blackjack card game win conditions to one thousand (1000) players in less than ten (10) minutes.

What is claimed is:

1. A method for facilitating an online card game utilizing a special virtual deck of cards and a conventional virtual deck of cards for a given game event, the conventional virtual deck of cards consisting of fifty-two cards divided into four suits of Spades, Hearts, Diamonds and Clubs, each suit having thirteen playing cards consisting of low value number cards to high value number cards of 2, 3, 4, 5, 6, 7, 8, 9, 10 and face cards of Jack, Queen, King and Ace; the special virtual deck of cards is either a restricted virtual deck consisting of less than all of the fifty-two cards defined by the conventional virtual deck, or an enhanced virtual deck that includes at least one card in addition to all of the fifty-two cards defined by the conventional virtual deck, the method being performed by at least one processor of at least one computing device and comprising:

initiating a game event of an online card game;

determining that at least one card of a first hand defined by the game event should be dealt from a special virtual deck, wherein the first hand is dealt to a specific individual;

transmitting a first call for the at least one card to be determined from cards comprising the special virtual deck;

outputting, via a graphical user interface for the game event, the at least one card as determined from the special virtual deck;

transmitting a second call for a remainder of cards for the first hand to be determined from cards comprising a conventional virtual deck;

modifying the graphical user interface for the game event to output the remainder of the cards as determined from the conventional virtual deck;

determining, based on the at least one card determined from cards comprising the special virtual deck and the remainder of cards determined from the cards comprising the conventional virtual deck, the first hand for the game event; and determining a result of the game event based on the first hand.

2. The method of claim 1, wherein the special virtual deck corresponds to a first algorithm accessible to a first RNG and the conventional virtual deck corresponds to a second algorithm accessible to a second RNG.

3. The method of claim 2, wherein the first RNG and the second RNG comprise a single RNG.

4. The method of claim 1, wherein the restricted virtual deck includes only 10s, Aces and face cards and the first hand is a player hand in a blackjack game.

5. The method of claim 1, wherein the restricted virtual deck includes only relatively low value number cards and is a dealer hand in a blackjack game.

6. The method of claim 1, wherein the special virtual deck comprises additional high value cards that are not included in the conventional virtual deck.

7. The method of claim 1, wherein determining that at least one card of the first hand defined by the game event should be dealt from a special virtual deck comprises determining that a player associated with the game event has qualified for the special virtual deck based on game play events.

8. The method of claim 7, wherein determining that the player associated with the game event has qualified for the special virtual deck based on game play events comprises determining that the player has obtained a result in at least one previous game play event that qualifies the player to have the at least one card dealt for the first hand from cards comprising the special virtual deck.

9. The method of claim 1, wherein determining that at least one card of the first hand defined by the game event should be dealt from a special virtual deck comprises determining that a player associated with the game event has paid a fee for access to the special virtual deck.

10. The method of claim 9, wherein the fee is a percentage of a wager placed on the game event, that is paid by the player in addition to the wager.

11. The method of claim 10, wherein the percentage is fifty percent and the fee is returned to the player only if the player wins the wager as a result of the game event.

12. The method of claim 10, wherein the percentage is twenty percent and the fee is retained by a gaming establishment even if the player wins the wager as a result of the game event.

13. The method of claim 9, wherein the fee is retained in play if a result of the game event is a push.

14. The method of claim 13, wherein the fee is retained in play only if the result of the game is a blackjack push.

15. The method of claim 1, wherein determining that at least one card of the first hand defined by the game event should be dealt from a special virtual deck comprises determining that a player associated with the game event has placed a wager of a sufficient value on the game event.

16. The method of claim 1, further comprising:
transmitting a third call for cards to be dealt to a second hand, the cards for the second hand to be determined from cards comprising the conventional virtual deck.

17. The method of claim 16, wherein the online game is a blackjack game.

18. The method of claim 17, wherein one of the first hand and the second hand is a player hand while the other of the first hand and the second hand is a dealer hand.

19. A non-transitory computer-readable medium storing instructions for execution by a processor of a computing device, the instructions for facilitating an online card game utilizing a special deck of cards and a conventional deck of cards for a given game event, the conventional deck of cards consisting of fifty-two cards divided into four suits of Spades, Hearts, Diamonds and Clubs, each suit having thirteen playing cards consisting of low value number cards to high value number cards of 2, 3, 4, 5, 6, 7, 8, 9, 10 and face cards of Jack, Queen, King and Ace; the special deck of cards is either a restricted deck consisting of less than all of the fifty-two cards defined by the conventional deck, or an enhanced deck that includes at least one card in addition to all of the fifty-two cards defined by the conventional deck, wherein the instructions cause the processor to:

initiate a game event of an online card game;

determine that at least one card of a first hand defined by the game event should be dealt from a special deck, wherein the first hand is dealt to a specific individual;

transmit a first call for the at least one card to be determined from cards comprising the special deck;

outputting, via a game interface for the game event, the at least one card;

transmit a second call for a remainder of cards for the first hand to be determined from cards comprising a conventional deck;

output, via the game interface for the game event, the remainder of the cards;

determine, based on the at least one card determined from cards comprising the special deck and the remainder of cards determined from the cards comprising the conventional deck, the first hand for the game event; and determine a result of the game event based on the first hand.

* * * * *